(12) United States Patent
Roth

(10) Patent No.: US 12,447,509 B1
(45) Date of Patent: Oct. 21, 2025

(54) CLEANING AND DETERRENT DEVICE FOR WATER APPARATUS

(71) Applicant: Christopher John Roth, Waupaca, WI (US)

(72) Inventor: Christopher John Roth, Waupaca, WI (US)

( * ) Notice: Subject to any disclaimer, the term of this patent is extended or adjusted under 35 U.S.C. 154(b) by 0 days.

(21) Appl. No.: 18/119,249

(22) Filed: Mar. 8, 2023

(51) Int. Cl.
| | | |
|---|---|---|
| *B08B 3/02* | (2006.01) | |
| *B08B 3/14* | (2006.01) | |
| *B08B 13/00* | (2006.01) | |
| *B63B 59/04* | (2006.01) | |
| *B63B 59/06* | (2006.01) | |

(52) U.S. Cl.
CPC ............... *B08B 3/02* (2013.01); *B08B 3/14* (2013.01); *B08B 13/00* (2013.01); *B63B 59/04* (2013.01); *B63B 59/06* (2013.01); *B08B 2203/0223* (2013.01); *B08B 2203/027* (2013.01)

(58) Field of Classification Search
None
See application file for complete search history.

(56) References Cited

U.S. PATENT DOCUMENTS

| | | | |
|---|---|---|---|
| 2,928,606 A | 3/1960 | Lee | |
| 4,852,802 A | 8/1989 | Iggulden et al. | |
| 5,009,192 A | 4/1991 | Burman | |
| 5,330,104 A | 7/1994 | Marcus | |
| 5,974,423 A | 10/1999 | Margolin | |
| 6,189,811 B1 * | 2/2001 | Rudy | F04B 17/006 239/525 |
| 6,857,583 B2 | 2/2005 | Attar | |
| 9,797,626 B1 * | 10/2017 | Best | F24S 50/20 |
| 9,973,141 B2 | 5/2018 | Hammad et al. | |
| 10,250,184 B2 | 4/2019 | Newdoll et al. | |
| 11,303,244 B2 | 4/2022 | Khayyat et al. | |
| 11,318,395 B2 | 5/2022 | Hedlund | |
| 2002/0066473 A1 | 6/2002 | Levy et al. | |
| 2008/0223277 A1 | 9/2008 | Maglish | |
| 2009/0266284 A1 | 10/2009 | Carmichael et al. | |
| 2012/0120641 A1 | 5/2012 | Yassa | |
| 2017/0036246 A1 | 2/2017 | Sun et al. | |
| 2020/0044600 A1 | 2/2020 | Mareli et al. | |
| 2020/0052646 A1 * | 2/2020 | Fischer | H02S 20/23 |
| 2021/0351740 A1 | 11/2021 | Nagler et al. | |
| 2022/0228775 A1 | 7/2022 | Ramirez | |

* cited by examiner

*Primary Examiner* — Eric W Golightly
(74) *Attorney, Agent, or Firm* — BRRLaw LLC; Bryan R. Rosiejka

(57) ABSTRACT

An inventive cleaning and deterrent device comprises a first transfer member connected to a pump member, a second transfer member connected to the pump member and a storage member, a third transfer member connected to the storage member and at least one nozzle member, and a power source member. In some embodiments, the inventive device can further comprise at least one of a check valve member, a pressure control member, a header member, a motion sensor member, a charging member, a voltage control member, and an encasement member.

28 Claims, 6 Drawing Sheets

CLEANING AND DETERRENT DEVICE FOR WATER APPARATUS

TECHNICAL FIELD

The present disclosure relates to an inventive cleaning and deterrent device for water apparatus which are intended to be utilized in a water body during use. In some more particular embodiments, the inventive cleaning and deterrent device can utilize the water in which the apparatus resides for cleaning the apparatus and/or for deterring organisms away from the apparatus.

BACKGROUND

Water apparatus which are intended to reside in water bodies (e.g., lakes, rivers, ponds, large pools, etc.) during use, particularly platform-style apparatus (e.g., piers, floating docks, pontoons, etc.) often provide positive experiences to users. However, due to the nature of their use, such apparatus are substantially exposed to environmental elements, and furthermore tend to attract a myriad of organisms, such as animals (e.g., waterfowl) and insects. As a result, such water apparatus routinely become soiled with foulment, such as feces, insect deposits and/or carcasses, dirt, grime, and the like. Users must thereafter spend time and physical effort (e.g., sweeping, wiping, spraying, scrubbing, etc.) in an attempt to clean such fouled apparatus prior to the utilization and enjoyment thereof. In addition, such cleaning efforts do not help prevent organisms from re-fouling the apparatus after being cleaned. Thus, there is a need for a cleaning and deterrent device which can manually and/or automatically remove, and can further help prevent, the befouling of such apparatus.

It is desirable that such a cleaning and deterrent device would primarily or solely utilize water as a liquid solution for dissolving and otherwise removing undesirable foulment from the apparatus, in order to prevent the introduction of chemicals into the water body. However, it may be over-burdensome or even impossible to string a hose, for example, from a household faucet to the apparatus when in use. Thus, there is also a need for a cleaning and deterrent device which can utilize the water body as a source for water, thus recycling the water used therefor (i.e., such that the cleaning and deterrent device may be considered environmentally friendly and green technology).

It is also desirable that such a cleaning and deterrent device could utilize electrical energy to power its operation. However, it may be over-burdensome or unsafe to string an electrical extension cord, for example, from a household power source to the apparatus during use. Likewise, it may be over-burdensome and potentially harmful to the environment to tote a gas-powered generator to the apparatus during use for each cleaning. Thus, there is a further need for a cleaning and deterrent device that can utilize a natural and/or carbon-free source of electrical power (e.g., solar energy, wind energy, water turbines, etc.) for the operation thereof (i.e., such that the cleaning and deterrent device may be considered environmentally friendly and green technology).

In addition, it is desirable that such a cleaning and deterrent device would minimize its encroachment upon the usable area of the apparatus, such that the usage and enjoyment of the apparatus could be maximized, and that such cleaning and deterrent device would not appear unsightly. Thus, there is also a need for a cleaning and deterrent device that may be relatively compact, and could be mounted to an apparatus at a location which minimizes the encroachment of the cleaning and deterrent device upon the usable surface of the apparatus.

SUMMARY

The invention of the present disclosure solves one or more of the problems enumerated above.

In one preferred embodiment of the present disclosure, an inventive cleaning and deterrent device for use with a water apparatus disposed within a water body comprises a first transfer member having a first end and a second end, a pump member having an inlet element and an outlet element, a second transfer member having a first end and a second end, a storage member having an inlet element and an outlet element, a third transfer member having a first end and a second end, a nozzle member having an inlet end and an outlet end, and a power source member, wherein the water body comprises cleaning water, wherein the first end of the first transfer member is disposed into the water body and the second end of the of the first transfer member is connected to the inlet element of the pump member, wherein the first end of the second transfer member is connected to the outlet element of the pump member and the second end of the second transfer member is connected to the inlet element of the storage member, wherein the first end of the third transfer member is connected to the outlet element of the storage member and the second end of the third transfer member is connected to the inlet end of the nozzle member, wherein the pump member is electrically connected to the power source member, wherein the cleaning and deterrent device can withdraw cleaning water from the water body via the first end of the first transfer member, and wherein the cleaning and deterrent device can dispose (i.e., expel) the cleaning water onto the water apparatus via the nozzle member.

In some aspects of this embodiment, the cleaning and deterrent device further comprises an optional device switch capable of energizing and de-energizing the cleaning and deterrent device, wherein the device switch is electrically connected between the power source member and the pump member. In other aspects, the cleaning and deterrent device further comprises an optional filter member capable of filtering the cleaning water, wherein the filter member is connected to the first end of the first transfer member. In yet other aspects, the cleaning and deterrent device further comprises an optional check valve member capable of preventing back flow within the cleaning and deterrent device, wherein the check valve member is connected between the first transfer member and the storage member. In still other aspects, the cleaning and deterrent device further comprises an optional pressure control member capable of engaging the pump member to attain a designated water pressure within the cleaning and deterrent device, and is further capable of turning off the pump member upon attaining the designated water pressure, wherein the pressure control member is connected between the pump member and the storage member.

In some aspects of this embodiment, the cleaning and deterrent device further comprises an optional motion sensor member capable of detecting movement, wherein the motion sensor member is electrically connected between the power source member and the pump member, and wherein the motion sensor member is positioned to detect movement upon a top side surface of the water apparatus.

In some aspects of this embodiment, the cleaning and deterrent device further comprises an optional motion sensor member capable of detecting movement and an optional shutoff valve member capable of allowing and preventing cleaning water flow within the cleaning and deterrent device, wherein the shutoff valve member is electrically controlled and is connected between the storage member and the nozzle member, wherein the motion sensor member is electrically connected between the power source member and the shutoff valve member, and wherein the motion sensor member is positioned to detect movement upon a top side surface of the water apparatus. In some further aspects of this embodiment, the cleaning and deterrent device further comprises an optional motion sensor switch electrically connected between the power source member and the motion sensor member. In other further aspects of this embodiment, the cleaning and deterrent device further comprises an optional device switch capable of allowing and preventing the cleaning and deterrent device to operate, wherein the device switch is electrically connected between the motion sensor member and the shutoff valve member.

In some aspects of this embodiment, the power source member is in the form of a rechargeable battery. In some further aspects of this embodiment, the cleaning and deterrent device further comprises an optional charging member capable of maintaining the rechargeable battery in a fully charged state, wherein the charging member is electrically connected to the rechargeable battery. In yet further aspects, the optional charging member is in the form of a solar panel. In other further aspects of this embodiment, the cleaning and deterrent device further comprises an optional voltage control member capable of preventing the rechargeable battery from being overcharged, and an optional shutoff valve member capable of allowing and preventing cleaning water flow within the cleaning and deterrent device, wherein the shutoff valve member is electrically controlled and is connected between the storage member and the nozzle member, and wherein the voltage control member is electrically connected between the rechargeable battery and the shutoff valve member.

In some aspects of this embodiment, the cleaning and deterrent device further comprises an optional header member capable of accommodating a plurality of nozzle members, wherein the header member is connected between the second end of the third transfer member and the inlet ends of the plurality of nozzle members. In other aspects, the cleaning water is expelled from the nozzle member at a water pressure of about 60 psi to about 120 psi.

In some aspects of this embodiment, the cleaning and deterrent device further comprises an encasement member, wherein at least a portion of the cleaning and deterrent device is disposed within the encasement member.

In another preferred embodiment of the present disclosure, a method of making an inventive cleaning and deterrent device comprises:

A. providing a first transfer member having a first end and a second end, a pump member having an inlet element and an outlet element, a second transfer member having a first end and a second end, a storage member having an inlet element and an outlet element, a third transfer member having a first end and a second end, a nozzle member having an inlet end and an outlet end; and a power source member;

B. connecting the second end of the first transfer member to the inlet element of the pump member;

C. connecting the first end of the second transfer member to the outlet element of the pump member;

D. connecting the second end of the second transfer member to the inlet element of the storage member;

E. connecting the first end of the third transfer member to the outlet element of the storage member;

F. connecting the second end of the third transfer member to the inlet end of the nozzle member; and G. electrically connecting the pump member to the power source member.

In some aspects of this embodiment, the method further comprises at least one selected from the group consisting of: providing an optional device switch and electrically connecting the device switch between the power source member and the pump member; providing an optional filter member and connecting the filter member to the first end of the first transfer member; providing an optional check valve member and connecting the check valve member between the first transfer member and the storage member; providing an optional pressure control member and connecting the pressure control member between the pump member and the storage member; providing an optional motion sensor member and electrically connecting the motion sensor member between the power source member and the pump member; providing an optional motion sensor member and an optional electrical shutoff valve member, connecting the electrical shutoff valve member between the storage member and the nozzle member, and electrically connecting the motion sensor member between the power source member and the electrical shutoff valve member; providing an optional charging member and electrically connecting the charging member to the power source member; providing an optional header member and connecting the header member between the third transfer member and the nozzle member; and providing an optional encasement member and disposing at least a portion of the cleaning and deterrent device within the encasement member.

In some aspects of this embodiment, the power source member is in the form of rechargeable battery. In some further aspects of this embodiment, the method further comprises providing a charging member, and electrically connecting the charging member to the rechargeable battery. In yet further aspects, the method further comprises providing a voltage control member, and electrically connecting the voltage control member between the rechargeable battery and the charging member.

In some aspects of this embodiment, the method further comprises providing an optional motion sensor member, an optional motion sensor switch and an optional electrical shutoff valve member, connecting the electrical shutoff valve member between the storage member and the nozzle member, electrically connecting the motion sensor member to the shutoff valve member, and electrically connecting the motion sensor switch between the motion sensor member and the power source member.

In some aspects of this embodiment, the method further comprises providing an electrical shutoff valve member and a voltage control member, connecting the electrical shutoff valve member between the storage member and the nozzle member, and electrically connecting the voltage control member between the electrical shutoff valve member and the power source member.

In another preferred embodiment of the present disclosure, a method of using an inventive cleaning and deterrent device comprises:

A. providing a water apparatus;

B. disposing the water apparatus into a water body, wherein the water body comprises cleaning water;

C. providing a cleaning and deterrent device comprising a first transfer member having a first end and a second end, a pump member having an inlet element and an outlet element, a second transfer member having a first end and a second end, a storage member having an inlet element and an outlet element, a third transfer member having a first end and a second end, a nozzle member having an inlet end and an outlet end, and a power source member;

D. disposing the cleaning and deterrent device upon the water apparatus;

E. positioning the nozzle member such that cleaning water expelled by the cleaning and deterrent device contacts a target area of the water apparatus during operation of the cleaning and deterrent device;

F. disposing the first end of the first transfer member into the water body; and G. energizing the device 100 via the power source 400;

wherein the second end of the of the first transfer member is connected to the inlet element of the pump member; wherein the first end of the second transfer member is connected to the outlet element of the pump member and the second end of the second transfer member is connected to the inlet element of the storage member; wherein the first end of the third transfer member is connected to the outlet element of the storage member and the second end of the third transfer member is connected to the inlet end of the nozzle member; and wherein the pump member is electrically connected to the power source member.

In some aspects of this embodiment, the cleaning and deterrent device further comprises at least one selected from the group consisting of: an optional device switch electrically connected between the power source and the pump member; an optional filter member connected to the first end of the first transfer member; an optional check valve member connected between the first transfer member and the storage member; an optional pressure control member connected between the pump member and the storage member; an optional motion sensor member electrically connected between the power source member and the pump member; an optional motion sensor member and an optional electrical shutoff valve member, wherein the electrical shutoff valve member is connected between the storage member and the nozzle member, and the motion sensor member is electrically connected between the power source member and the electrical shutoff valve member; an optional charging member electrically connected to the power source member; an optional header member connected between the third transfer member and the nozzle member; and an optional encasement member wherein at least a portion of the cleaning and deterrent device is disposed therein.

In some aspects of this embodiment, the power source member is in the form of a rechargeable battery. In some further aspects the cleaning and deterrent device further comprises a charging member, wherein the charging member is electrically connected to the rechargeable battery. In yet further aspects, the cleaning and deterrent device further comprises a voltage control member, wherein the voltage control member is electrically connected between the rechargeable battery and the charging member.

In some aspects of this embodiment, the cleaning and deterrent device further comprises an optional motion sensor member, an optional motion sensor switch and an optional electrical shutoff valve member, wherein the electrical shutoff valve member is connected between the storage member and the nozzle member, wherein the motion sensor member is electrically connected between the electrical shutoff valve member and the motion sensor switch, and wherein the motion sensor switch is electrically connected to the power source member.

In some aspects of this embodiment, the cleaning and deterrent device further comprises an electrical shutoff valve member and a voltage control member, wherein the electrical shutoff valve member is connected between the storage member and the nozzle member, and wherein the voltage control member is electrically connected between the electrical shutoff valve member and the power source member.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings where:

Figure 5:
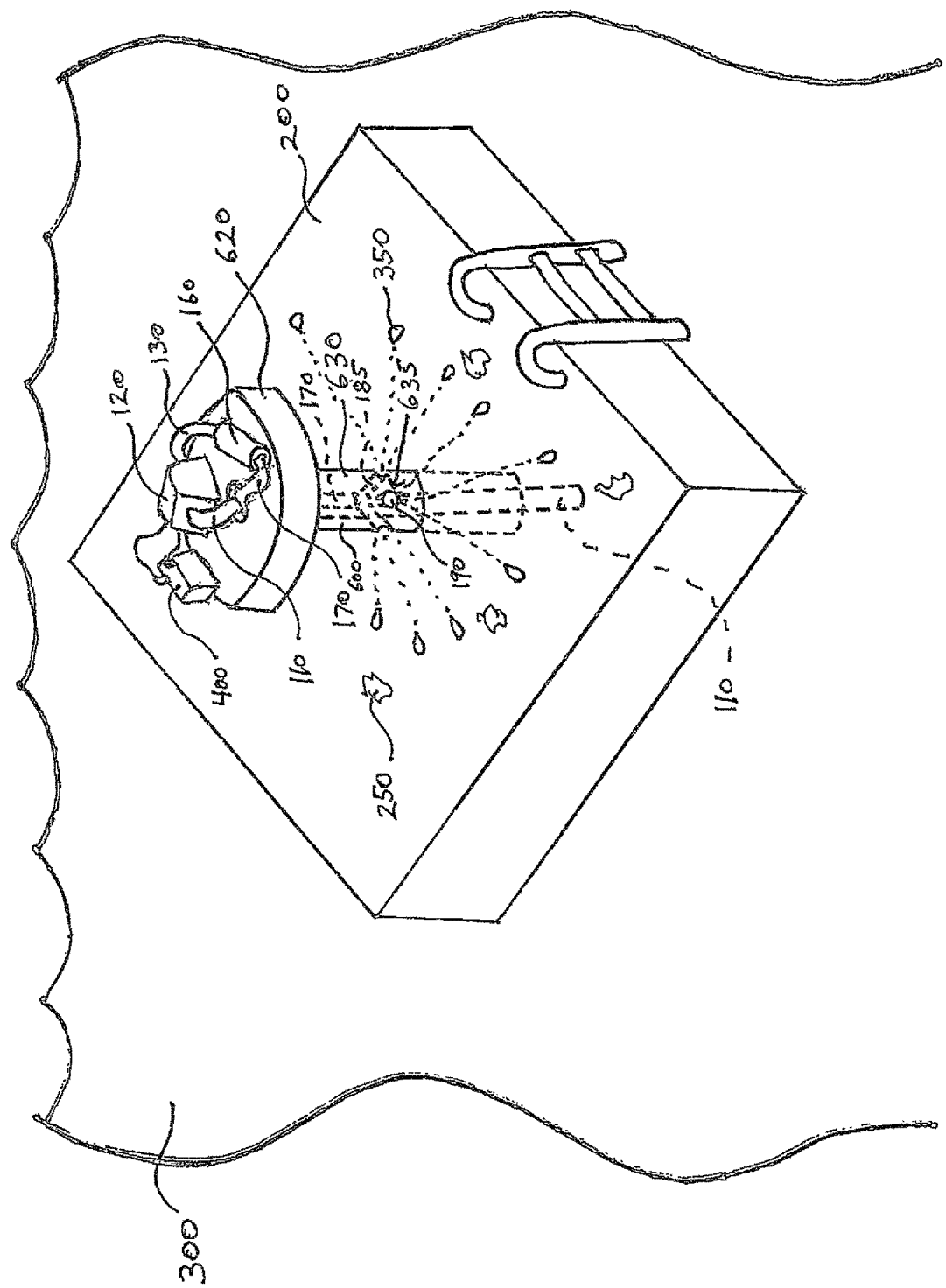
Figure 6:
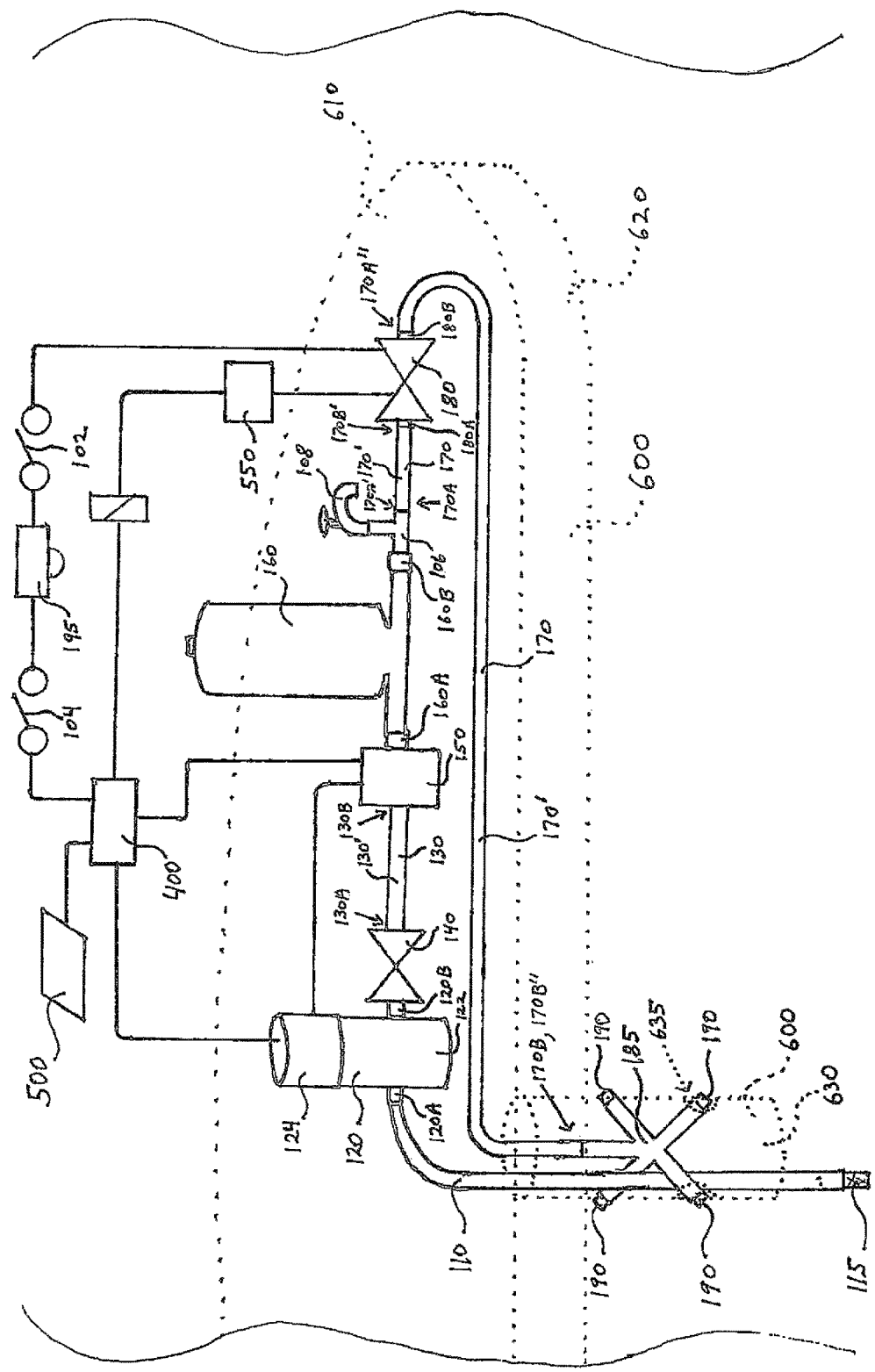

FIG. 5 is a perspective view showing a non-limiting exemplary embodiment of the inventive cleaning and deterrent device at least partially disposed within an optional encasement member, and wherein the cleaning and deterrent device is mounted to a water apparatus in the form of a floating dock disposed upon a water body; and FIG. 6 is a plan view showing the non-limiting exemplary embodiment of FIG. 5.

Repeated use of reference characters in the present specification and drawings is intended to represent the same or analogous features or elements of the present invention. It should be understood that the drawings herein are not intended to be drawn to scale, but rather are drawn to show particular elements of the invention.

Definitions

It should be noted that, when employed in the present disclosure, the terms "a" and "an" are intended to mean "at least one" of any stated features, elements, integers, steps, components, or groups and are not intended to be limited to only one of such features, elements, integers, steps, components, or groups thereof, except where specifically stated as such. In addition, use of the phrase "at least one" is not intended to render other uses of the terms "a" or "an" to be limited to only one of a feature, element, integer, step, component, or group.

It should be noted that, when employed in the present disclosure, the terms "comprises," "comprising" and other derivatives from the root term "comprise" are intended to be open ended terms that specify the presence of any stated features, elements, integers, steps, components, or groups, and are not intended to preclude the presence or addition of one or more other features, elements, integers, steps, components, or groups thereof.

It should be understood that, with respect to the construction and/or description of the inventive cleaning and deterrent device herein, the term "connected" on its own refers to a physical connection of components, whereas the term "electrically connected" refers to an electrical connection of components, except where specifically stated otherwise.

It should be understood that as used herein when referring to an item being connected between a first component and a second component, the word "between" does not preclude the item being disposed within the first component or within the second component.

The term "foulment" refers to undesirable foreign matter which may be disposed upon a water apparatus.

The term "water apparatus" refers to an apparatus that is conventionally utilized upon a water body, and which comprises at least one surface disposed outside the water body.

The term "water body" refers to a body of water upon which a water apparatus resides during conventional use.

These terms may be defined with additional language in the remaining portions of the specification.

DETAILED DESCRIPTION

The invention is generally directed to an inventive cleaning and deterrent device for a water apparatus, which is intended to reside in a body of water during use. More particularly, the invention is directed to an environmentally friendly and/or green technology cleaning and deterrent device for manually and/or automatically cleaning/removing foulment from water apparatus which are intended to reside in water bodies (e.g., lakes, rivers, ponds, large pools, etc.) during use, including but not limited to platform-style apparatus (e.g., piers, floating docks, pontoons, etc.).

Although several exemplary embodiments of the present invention will be described herein, it should be understood that the disclosed embodiments are intended merely as non-limiting examples of the invention that may be embodied in various forms. Therefore, specific details disclosed herein, such as relating to structure, function, and the like, are not to be interpreted as limiting in any manner whatsoever, but rather only as one of numerous example bases for claims and/or teaching persons having ordinary skill in the art to variously employ the present invention in virtually any appropriately detailed structure or circumstance.

Accordingly, in the interest of brevity and conciseness, descriptions herein may be substantially directed to the non-limiting exemplary form of an inventive cleaning and deterrent device comprising electrical energy power for use on a water apparatus in the non-limiting exemplary form of a floating dock.

To gain a better understanding of the present invention, attention is directed to FIGS. 1-6 for exemplary purposes showing non-limiting embodiments of an inventive cleaning and deterrent device 100 of the present disclosure. As illustrated, the inventive cleaning and deterrent device 100 is shown in a non-limiting exemplary form comprising at least a first transfer member 110, a pump member 120, a second transfer member 130, a storage member 160, a third transfer member 170, a nozzle 190 and a power source member 400.

With reference to FIGS. 1-6, the inventive cleaning and deterrent device 100 comprises a pump member 120 that is capable of pumping water. Preferably, the pump member 120 is electrically operated (e.g., via an electrical motor), and can operate at the same voltage as provided by the power source member 400 component (e.g., a rechargeable battery) of the inventive device 100. The purpose of the pump member 120 is to transfer cleaning water 350 from a water source (i.e., the water body 300) to a storage member 160 (which may be pressurized). The pump member 120 typically comprises a motor element 124 (e.g., an electrical motor), a pumping element 122, an inlet element 120A through which cleaning water 350 travels into the pump member 120, and an outlet element 120B from which the cleaning water 350 exits the pump member 120. The rate of pumping capability is not critical, provided such rate is sufficient to fill the storage member 160 prior to expulsion of the cleaning water 350 disposed therein. There are no particular limits as to the type of pump utilized (e.g., submersible pump, centrifugal pump, piston pump, plunger pump, diaphragm pump, gear pump, lobe pump, screw pump, vane pump, etc.) provided the pump member 120 is capable of pumping cleaning water 350 at a desired rate and/or pressure. Preferably, the pump member 120 will be a relatively low voltage pump (e.g., about 6-12 volts of electricity). However, it should be understood that other voltage pumps as are known to persons having ordinary skill in the art can also be utilized without departing from the scope of the invention. In some preferred embodiments, the pump member 120 is of a self-priming style pump. In one non-limiting example, a self-priming BAYITE Model No. BYT-7A102 diaphragm pump (available from Bayite, having a place of business located in China, and available for purchase from Amazon.com) was utilized as the pump member 120 for the inventive cleaning and deterrent device 100, which is a 12 Volt DC, 3 amp, positive displacement diaphragm pump having a maximum pressure of 100 psi, a maximum flow rate of 1 gpm, a built-in check valve, and a built-in pressure cut-off switch set at 80 psi capable of starting and stopping the pump member 120.

Continuing with FIGS. 1-6, the inventive cleaning and deterrent device 100 also comprises a first transfer member 110. The purpose of the first transfer member 110 is to obtain cleaning water 350 from the water body 300 and transfer such cleaning water 350 to the pump member 120. The first transfer member 110 typically has a generally cylindrical shape profile (though it need not be), and comprises a first end 110A and an opposing second end 110B distal to the first end 120A. Typically the second end 110B of the first transfer member 110 is connected to the inlet element 120A of the pump member 120, and the first end 110A of the first transfer member 110 is disposed into the water body 300 during use. In some preferred embodiments, the first transfer member 110 can be in the form of tubing (e.g., rubber hose, plastic tubing, etc.), hard piping (e.g., PVC, metallic, plastic, etc.), or a combination thereof. Accordingly, the first transfer member 110 can be flexible, rigid, or a combination thereof without departing from the scope of the invention. Desirably, the length of the first transfer member 110 will be sufficient such that when the inventive cleaning and deterrent device 100 is disposed upon a water apparatus 200, the first end 110A will extend below the surface of the water body 300 (or even further down to a desired depth within the water body 300). The inner diameter of the first transfer member 110 can at least partially be determined by the size of the inlet element 120A of the pump member 120, and will desirably be sufficiently large enough to prevent starvation of pump member 120 during use. Typically, the inner diameter of the first transfer member 110 will range from about ¼ inch to about ¾ inch (about 6.4 mm to about 19.1 mm), although the first transfer member 110 can have an inner diameter of less than ¼ inch or greater than ¾ inch without departing from the scope of the invention. In one non-limiting example, approximately 3 feet (about 91.4 cm) of braided nylon tubing having an inner diameter of about ⅜ inch (about 9.5 mm) was utilized as the first transfer member 110 of the inventive cleaning and deterrent device 100. It should be understood that in the case of a submersible pump wherein the inlet element 120A is disposed below the surface of a water body 300, such a first transfer member 110 may not be required.

In some embodiments, an optional filter member 115 may be connected or otherwise coupled to the first end 110A of the first transfer member 110 (or to the inlet element 120A of a submersible pump member 120). However, such optional filter member 115 can alternatively be disposed at any point within the length of the first transfer member 110 without departing from the scope of the invention. The purpose of the optional filter member 115 is to help prevent undesirable foreign matter (e.g., debris, particulates, algae, organisms, etc.) which may be present in the water body 300 from entering into the inventive cleaning and deterrent device 100, and/or from ultimately being disposed upon the water apparatus 200. In one non-limiting example, a plastic coarse strainer having an outer diameter of about ⅜ inch (about 9.5 mm) was utilized as an optional filter member 115 of the inventive cleaning and deterrent device 100.

Continuing with FIGS. 1-6, the inventive cleaning and deterrent device 100 also comprises a second transfer member 130, which in some embodiments may be comprised of multiple segments 130' thereof. The purpose of the second transfer member 130 is to transfer cleaning water 350 from the pump member 120 to the storage member 160. The second transfer member 130 typically has a generally cylindrical shape profile (though it need not be), and comprises a first end 130A and an opposing second end 130B distal to the first end 130A. Typically the first end 130A of the second transfer member 130 is connected to the outlet element 120B of the pump member 120, and the second end 130B of the second transfer member 130 leads into or is connected to the inlet element 160A of the storage member 160. In some preferred embodiments, the second transfer member 130 can be in the form of tubing (e.g., rubber hose, plastic tubing, etc.), hard piping (e.g., PVC, metallic, plastic, etc.), or a combination thereof. Accordingly, the second transfer member 130 can be flexible, rigid, or a combination thereof without departing from the scope of the invention. Desirably, the overall length of the second transfer member 130 should be at least sufficient to extend from the pump member 120 to the storage member 160, though it may be longer without departing from the scope of the invention. The inner diameter of the second transfer member 130 can at least partially be determined by the size of the outlet element 120B of the pump member 120 and/or the size of the inlet element 160A of the storage member 160, and will desirably be sufficiently large enough to prevent undesirable back pressure to, or cavitation of, the pump member 120 during use. Typically, the inner diameter of the second transfer member 130 will range from about ¼ inch to about ¾ inch (about 6.4 mm to about 19.1 mm), although the second transfer member 130 can have an inner diameter of less than ¼ inch or greater than ¾ inch without departing from the scope of the invention. In one non-limiting example, approximately 6 inches (about 15.2 cm) of braided nylon tubing having an inner diameter of ⅜ inch (about 9.5 mm) was utilized as the second transfer member 130 of the inventive cleaning and deterrent device 100.

In some embodiments, the inventive cleaning and deterrent device 100 can comprise a suitably sized optional check valve member 140 disposed between the pump member 120 and the storage member 160. Such a check valve member 140 may be disposed within the first transfer member 110, between the first transfer member 110 and the pump member 120, within the pump member 120, between the pump member 120 and the second transfer member 130, within the second transfer member 130, or between the second transfer member 130 and the storage member 160. Such optional check valve member 140 may be desirable to help prevent backflow of the cleaning water 350 within the second transfer member 130, and may further help maintain pressure within the storage member 160. Suitable check valve members 140 include those known to persons having ordinary skill in the art, such as ball check valves, swing check valves, wafer-type check valves, disc check valves, piston check valves, lift check valves, stop check valves, non-slam check valves, foot valves, and the like. As referenced above, in one non-limiting example, an optional check valve member 140 was disposed within the pump member 120 of the inventive cleaning and deterrent device 100.

Continuing with FIGS. 1-6, as referenced above, the inventive cleaning and deterrent device 100 also comprises a storage or buffer member 160 (e.g., a tank). Typically, such storage member 160 will comprise at least an inlet element or opening 160A to allow cleaning water 350 to transfer into the storage member 160 and an outlet element or opening 160B to allow cleaning water 350 to transfer out of the storage member 160. One purpose of the storage member 160 is to accumulate a quantity of cleaning water 350 that is sufficient for at least one (1) operational cycle of the cleaning and deterrent device 100. In some preferred embodiments, another purpose of the storage member 160 is to release a sufficient quantity of cleaning water 350 at a desired water pressure. Typically, such water pressure will range from about 60 psi to about 120 psi. However, it should be understood that water pressures of less than 60 psi or greater than 60 psi can also be utilized without departing from the scope of the invention. Accordingly, it may be desirable that the storage member 160 is capable of being pressurized. In such embodiments, this may be accomplished via an air bladder (not shown) disposed within a substantially sealed storage member 160 (i.e., sealed other than for the inlet element 160A and the outlet element 160B). In this non-limiting example, as cleaning water 350 is volumetrically added to the storage member 160, the air bladder increasingly compresses, which in turn increases the pressure within the storage member 160. In one non-limiting example, an AMARINE MADE 0.75 liter, 125 psi maximum, pre-pressurized accumulator tank comprising an internal air bladder (ASIN B07QJYPHM3, available from Alfa Marine (Shanghai) Co., Ltd, having a place of business located in Shanghai, China, and available for purchase from Amazon.com) was utilized as the storage member 160 for the inventive cleaning and deterrent device 100.

In some embodiments, a desired water pressure may be attained within the storage member 160 by filling with a specified quantity of cleaning water 350 (such as by utilizing a timer on the pump member 120 and/or a volumetric flow meter in the second transfer member 130 (which may be capable of signaling the pump member 120 to cease operation and/or resume operation). In other embodiments, a desired water pressure may be attained within the storage member 160 by the use of an optional pressure control member 150 (which may desirably be capable of electrically signaling the pump member 120 to cease operation and/or to resume operation) disposed within the pump member 120, between the pump member 120 and the second transfer member 130, within the second transfer member 130, between the second transfer member 130 and the storage member 160, or within the storage member 160. In still other embodiments, a desired water pressure may be attained within the storage member 160 by utilizing a pressure relief valve at the outlet element 160B of the storage member 160, which will automatically release a particular quantity of cleaning water 350 through the inventive device 100 upon reaching a preset pressure within the storage member 160 (e.g., which may be desirable wherein the pump member 120 tends to run constantly, such as at a relatively low flow rate). Still other devices and methods for attaining and/or releasing the cleaning water 350 at a given pressure include those known to persons having ordinary skill in the art (e.g., an electrically operated pressure pump), without departing from the scope of the invention. As referenced above, in one non-limiting example, an optional 80 psi pressure switch capable of starting and stopping the pump member 120 was disposed within the pump member 120 of the inventive cleaning and deterrent device 100.

Continuing with FIGS. 1-6, the inventive cleaning and deterrent device 100 also comprises a third transfer member 170, which in some embodiments may be comprised of multiple segments 170' thereof. The purpose of the third transfer member 170 is to transfer cleaning water 350 from the storage member 160 to the nozzle member 190. The third transfer member 170 typically has a generally cylindrical shape profile (though it need not be), and comprises a first end 170A and an opposing second end 170B distal to the first end 170A. Typically the first end 170A of the third transfer member 170 is connected to the outlet element 160B of the storage member 160, and the second end 170B of the third transfer member 170 leads into or is connected to the inlet end or element 190A of the nozzle member 190. In some preferred embodiments, the third transfer member 170 can be in the form of tubing (e.g., rubber hose, plastic tubing, etc.), hard piping (e.g., PVC, metallic, plastic, etc.), or a combination thereof. Accordingly, the third transfer member 170 can be flexible, rigid, or a combination thereof without departing from the scope of the invention. Desirably, the overall length of the third transfer member 170 should be at least sufficient to extend from the outlet element 160B of the storage member 160 to the inlet end or element 190A of the nozzle member 190 (at the nozzle member's mounted position), though it may be longer without departing from the scope of the invention. The inner diameter of the third transfer member 170 can at least partially be determined by the size of the outlet element 160B of the storage member 160 and/or the size of the inlet element 190A of the nozzle member 190, and will desirably be sufficiently large enough to prevent undesirable back pressure to the inventive device 100 during use. Typically, the inner diameter of the third transfer member 170 will range from about ¼ inch to about ¾ inch (about 6.4 mm to about 19.1 mm), although the third transfer member 170 can have an inner diameter of less than ¼ inch or greater than ¾ inch without departing from the scope of the invention. In one non-limiting example, approximately 12 inches (about 30.5 cm) of braided nylon tubing having an inner diameter of ½ inch (about 12.7 mm) was utilized for the third transfer member 170 of the inventive cleaning and deterrent device 100.

In some embodiments, the inventive cleaning and deterrent device 100 can comprise a suitably sized optional shutoff valve member 180 comprising an inlet element or opening 180A and an outlet element or opening 180B disposed between the storage member 160 and the third transfer member 170, between the third transfer member 170 and the nozzle member 190, or within the third transfer member 170. Such optional shutoff valve member 180 may be desirable for allowing or preventing the flow of the cleaning water 350 through the device 100 at desired times, and may further help build and maintain pressure within the storage member 160. Accordingly, such a shutoff valve member 180 can control the release of cleaning water 350 from the inventive device 100. Suitable shutoff valve members 180 can be manually controlled or electrically controlled, and include those known to persons having ordinary skill in the art, such as solenoid valves, ball valves, gate valves, straight stop valves, angle stop valves, globe valves, stop-and-waste valves, sweat stop valves, push-fit stop valves, three-way stop valves, PEX stop valves, CPVC stop valves, iron pipe stop valves, needle valves, and the like. In one non-limiting example, a 12 volt electrically controlled SHUNTONG Type 2WS1-20-51V-B32 brass solenoid valve having a port size of ¾ inch NPT and an orifice of 20 mm (available from Yuyao Shuntong Solenoid Valve Co., Ltd., having a place of business located in Yuyao, Ningbo, China) was utilized with the inventive cleaning and deterrent device 100 wherein the valve was disposed between the third transfer member 170 and the nozzle member 190 of the device 100.

Continuing with FIGS. 1-6, the inventive cleaning and deterrent device 100 also comprises at least one nozzle member 190. One purpose of the nozzle member 190 is to expel cleaning water 350 from the inventive device 100. Another purpose of the nozzle member 190 is to desirably modify the flow characteristics of the cleaning water 350 as it exits the cleaning and deterrent device 100, such as from a substantially single volumetric mass flow within the third transfer member 170 to a plurality of droplets and/or streams, for example. In general, each nozzle member 190 comprises an inlet end or element 190A and an opposing outlet end or element 190B distal to the inlet end 190A. Typically, the outlet end 190B of a nozzle member 190 will comprise one or more openings (not shown) which are smaller than the inlet end 190A opening (not shown) and/or may have a different shape profile than the inlet end 190A opening.

The type of nozzle member 190 will depend on many factors including, but not limited to, cleaning water 350 quantity, cleaning water 350 pressure, cleaning water 350 flow rate, target area size, target area location, type of foulment 250 to be removed, water apparatus 200 construction material, water apparatus 200 surface topography, and the like. Desirably, the water pressure exiting a suitable nozzle member 190 will be about 60 pounds per square inch (psi) to about 120 psi, such as about 70 psi to about 110 psi for improved effectiveness and safety benefits. However, it should be understood that water pressures of less than 60 psi or greater than 60 psi can also be utilized without departing from the scope of the invention. Suitable nozzle members 190 include those known to persons having ordinary skill in the art, including fan jet nozzles, shower nozzles, pattern nozzles, umbrella nozzles, geyser nozzles, solid stream nozzles, single jet nozzles, multi-jet nozzles, hollow jet nozzles, flat spray nozzles, cone nozzles, bouquet nozzles, sphere nozzles, rotating nozzles, and the like, and combinations thereof. In one non-limiting example, a single nozzle member 190 in the form of an ORBIT Model No. 54071 brass pop-up fan spray nozzle (available from Orbit Irrigation Products, Inc., having a place of business located in Salt Lake City, Utah, USA) was utilized via connecting the inlet element 190C of the nozzle member 190 to the second (outlet) end 170B of the third transfer member 170. In another non-limiting example, a single nozzle member 190 in the form of an ORBIT Model No. 54071 brass pop-up fan spray nozzle (available from Orbit Irrigation Products, Inc.,) wherein the pop-up portion was removed therefrom (essentially forming a hollow nozzle) was utilized for the invention. In yet another non-limiting example, a plurality of nozzle members 190, each in the form of a MROMAX ¼ inch MIP 80 degree standard VeeJet flat fan spray nozzle (available from Lawson Products, Inc., having a place of business located in Chicago, Illinois, USA), were utilized via connecting the respective inlet elements 190A of each nozzle member 190 to an optional header member 185, such that the cleaning water 350 was expelled from the inventive cleaning and deterrent device 100 in multiple directions. The purpose of an optional header member 185 is allow for a plurality of nozzle members 190, wherein the flow of cleaning water 350 is divided (preferably relatively equally) between each of the plurality of nozzle members 190. Typically, a header member 185 may be in the form of a generally pipe-like structure, an expanded pipe-like structure, a container-like structure, or a cross-connector structure, for example, having an inlet opening or element 185A and a plurality of outlet openings or elements 185B adapted for the attachment of nozzle members 190 thereto. Suitable header members 185 include those known to persons having ordinary skill in the art. In one non-limiting example, a ¼ inch 304 stainless steel female BSP threaded pipe fitting 5-way equal cross connector (Part Number FHW-PPFT-241120-00802, manufactured by e-ppfittings, available for purchase from Amazon.com) was utilized as a header member 185 to mount four (4) ¼ inch MROMAX VeeJet flat fan spray nozzles (available from Lawson Products, Inc.) for the inventive cleaning and deterrent device 100.

Continuing with FIGS. 1-6, the inventive cleaning and deterrent device 100 can also comprise one or more optional motion sensor members 195. Desirably, any such motion sensor member 195 will be electrically operated, preferably at the same voltage as provided by the power source 400 component of the inventive device 100. The purpose of the optional motion sensor member 195 is to detect movement of unwanted organisms (e.g., birds, animals, insects, etc.) upon the water apparatus 200. The detection of movement by the optional motion sensor member(s) 195 can then signal (e.g., electrical signal, wireless signal, etc.) the device 100 to activate a cleaning cycle (such as opening an optional shutoff valve member 180, if present) to expel cleaning water 350 onto the water apparatus 200, thus deterring such organisms from remaining on the water apparatus 200 (and potentially further deterring such organisms from coming or returning to the water apparatus 200 thereafter). Typically, an optional motion sensor member 195 will be mounted at a remote location upon the water apparatus 200 such that the sensed area of the water apparatus 200 will be maximized, though it need not be. It should be understood that an optional motion sensor member 195 can be placed at any location upon, or at an elevated height with respect to, the water apparatus 200 without departing from the scope of the invention. Suitable motion sensor members 195 include those known to persons having ordinary skill in the art, including active motion sensors, passive motion sensors, infrared motion detectors, photo-sensor motion detectors, microwave motion sensors, tomographic motion sensors, and the like. In one non-limiting example, a HILETGO Model No. 3-01-1113 motion sensor (available from Shenzhen HiLetgo Technology Co., Ltd, having a place of business located in Shenzhen, Guangdong, China), which is an 12 volt outdoor infrared PIR motion sensor having a 140-degree cone angle lens, was utilized as an optional motion sensor member 195. In another non-limiting example, a TOP GREENER Model No. MPC-50L motion sensor (available from Top Greener Inc., having a place of business located in Irvine, California, USA), which is a 360 degree low voltage motion sensor.

In some embodiments, the inventive cleaning and deterrent device 100 can include an optional motion sensor switch 104. The purpose of such an optional motion sensor switch 104 is to control the operation of an optional motion sensor member 195 (if present), and thus control the operation of the device 100. In some embodiments, such optional motion sensor switch 104 can be manipulated by physical activation/deactivation of the switch (e.g., a toggle switch) and/or by wireless activation/deactivation of the switch typically in conjunction with electronic circuitry and software (e.g., control via an application program or "app"). In one non-limiting example, an optional motion sensor switch 104 was electrically wired between an optional motion sensor member 195 and the power source member 400. However, it should be understood that an optional motion sensor switch 104 can be integrated into an optional motion sensor member 195 without departing from the scope of the invention.

Continuing with FIGS. 1-6, the inventive cleaning and deterrent device 100 can also comprise a power source member, preferably an electrical power source member 400. Suitable electrical power sources include those known to persons having ordinary skill in the art, such batteries, generators, household outlets, and the like. Desirably, the power source member 400 will provide a relatively low voltage (e.g., 6 volts-12 volts) to the device 100. However, it should be understood that the power source member 400 can range from 1.5 volts to 110 volts or higher without departing from the scope of the invention. In some preferred embodiments, the power source member 400 is portable such that it can be located in near-proximity to the other components of the device 100 (which can, inter alia, eliminate the need for relatively lengthy cables), such as in the form of a battery, for example. Where the power source member 400 is in the form of a battery, it may be desirable that such battery is rechargeable, such as a compact 12-volt battery, an automotive battery, a marine battery, and the like. In one non-limiting example, a compact rechargeable LPF-MAX LiFePO4 12.8 volt 6 Ah lithium iron phosphate deep cycle battery (available from Dongguan Feichi New Energy Technology Co., Ltd., having a place of business located in Dongguan, Guangdong, China) having a length of about 5.9 inches (15 cm), a width of about 2.4 inches (6.1 cm) and a height of about 3.3 inches (8.3 cm) was utilized for the inventive cleaning and deterrent device 100. In another non-limiting example, a Model No. CHB1275 battery (available from Campbell Hausfeld, having a place of business located in Harrison, Ohio, USA), which is a 12 volt, 75 Amp Hr, maintenance free, sealed lead acid battery, was utilized for the inventive cleaning and deterrent device 100. Preferably, a single power source member 400 can be utilized to power all of the electrical components of the inventive device 100 by electrically connecting the electrical components directly or indirectly to the power source member 400.

Continuing with FIGS. 1-6, in some embodiments, the inventive cleaning and deterrent device 100 can also comprise an optional charging member 500. Such charging member 500 can be highly desirable when the power source member 400 is in the form of a rechargeable battery. Accordingly, the purpose of the optional charging member 500 is to maintain the charge of a rechargeable power source member 400, and thus an optional charging member will typically be electrically connected to the a rechargeable power source member 400. In some preferred embodiments, such optional charging member 500 will preferably utilize a natural source of energy that can be converted into electrical current, thus contributing to the green technology of the present invention. Suitable charging members 500 include those known to persons having ordinary skill in the art, including solar energy chargers (e.g., solar panels), air current chargers (e.g., compact wind propelled turbines) and water current chargers (e.g., water turbines). In one non-limiting example, a LIXADA 20W portable solar panel (available from Lixada Inc., and available for purchase from Amazon.com), which is a 12 volt DC, 500 milliamp monocrystalline silicon solar cell panel having a panel size length of about 10.6 inches (27.0 cm), width of about 7.3 inches (18.5 cm) and a height (i.e., thickness) of about 0.1 inch (0.3 cm) was utilized as an optional charging member 500. Due to the structural integrity of such solar panels, it may desirable mount the solar panel onto a support structure to provide additional structural support, thus forming a charging member 500/structural support combination. In the case of energy charging members 500 which utilize solar energy, it may be desirable that such charging members have a relatively compact size to minimize interference with the water apparatus 200, such as having an area of about 3 ft$^2$ (0.28 m$^2$) or less, for improved benefits. However, it should be understood that a suitable solar energy charging member 500 can have an area that is greater than 3 ft$^2$ without departing from the scope of the invention.

The optional charging member 500 can be located proximate to the power source member 400, though it need not be. Desirably, such location will also minimize interference with enjoyment of the water apparatus 200 by a user.

In some embodiments, it may desirable to include an optional voltage control member 550, which can help prevent overcharging the power source member 400 (such as when in the form of a rechargeable battery). For example, such a voltage control member 550 can be in the form of a voltage regulator or a "smart" device which can ultimately regulate the amount of current flowing to the power source member 400 at any given time. In another example, such a voltage control member 550 can be in the form of a device which breaks the charging circuit when a full charge is attained, and re-engages the charging circuit when needed. In still another example, such a voltage control member 550 can be in the form of a controller which can initiate operation, or "cycle", the inventive cleaning and deterrent device 100 each time a full charge is attained. In one non-limiting example, EFANS STUDIO digital LED voltage regulator cut off protection board (available from Efans Studio, having a place of business located in Shenzhen, Guangdong, China, and also available for purchase from eBay.com) was utilized as an optional voltage control member 550. In a first non-limiting aspect, the voltage regulator cut off protection board was electrically wired with a relay between an optional charge member 500 in the form of a solar panel and the power source member 400 in the form of a rechargeable battery. In this aspect, the voltage control member 550 regulated the battery charge by merely terminating or re-engaging the charging voltage from the solar panel. In a second non-limiting aspect, the voltage regulator cut off protection board was electrically wired with a relay between an optional shutoff valve member 180 in the form of an electrical solenoid valve and the power source member 400 in the form of a rechargeable battery. In this aspect, the voltage control member 550 regulated the battery charge by cycling the inventive device 100 each time the battery attained a charge of 100%.

Figure 1:
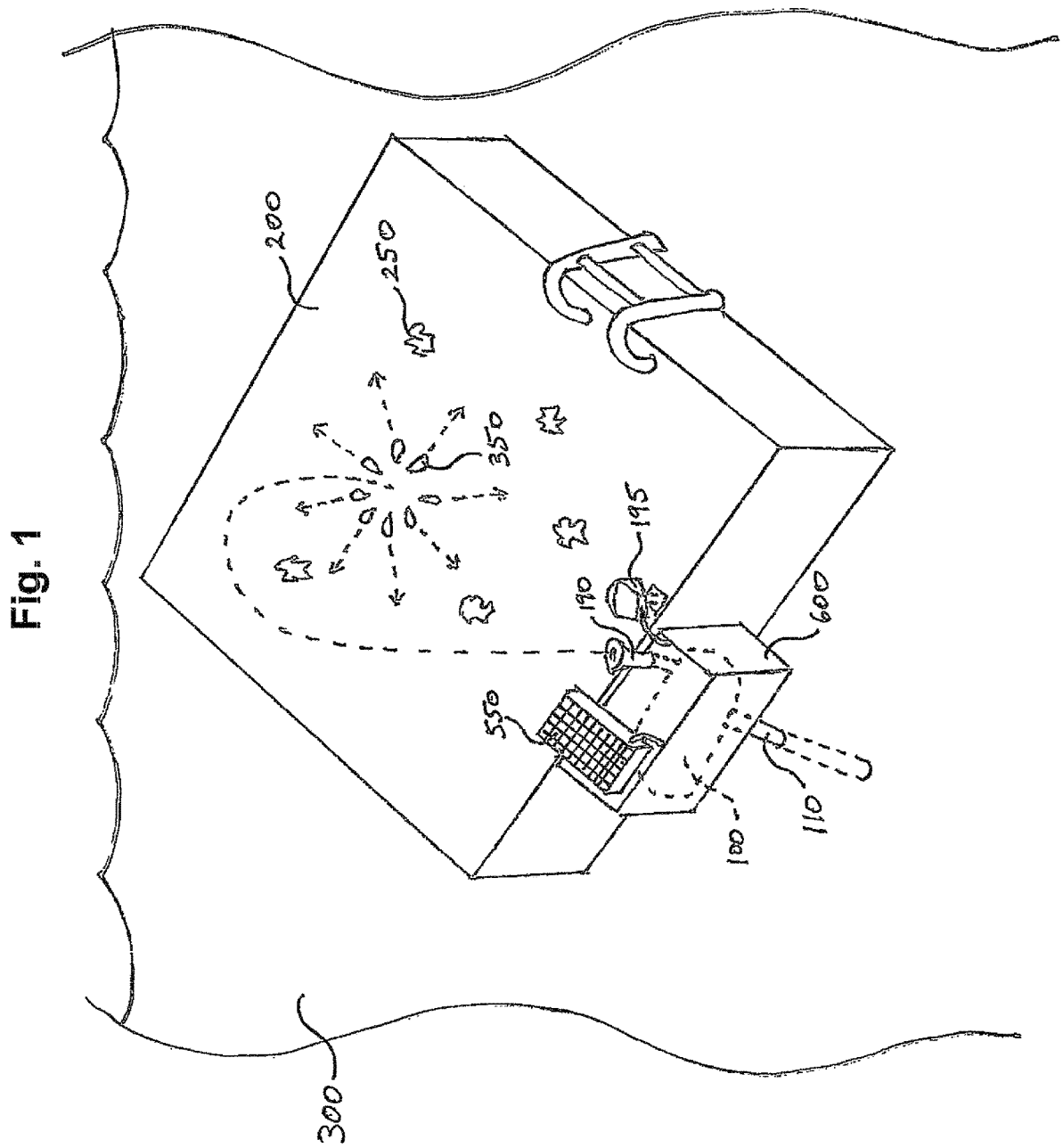
FIG. 1 is a perspective view showing a non-limiting exemplary embodiment of the inventive cleaning and deterrent device at least partially disposed within an optional encasement member, and wherein the cleaning and deterrent device is disposed upon a water apparatus in the form of a floating dock disposed upon a water body.
Figure 2:
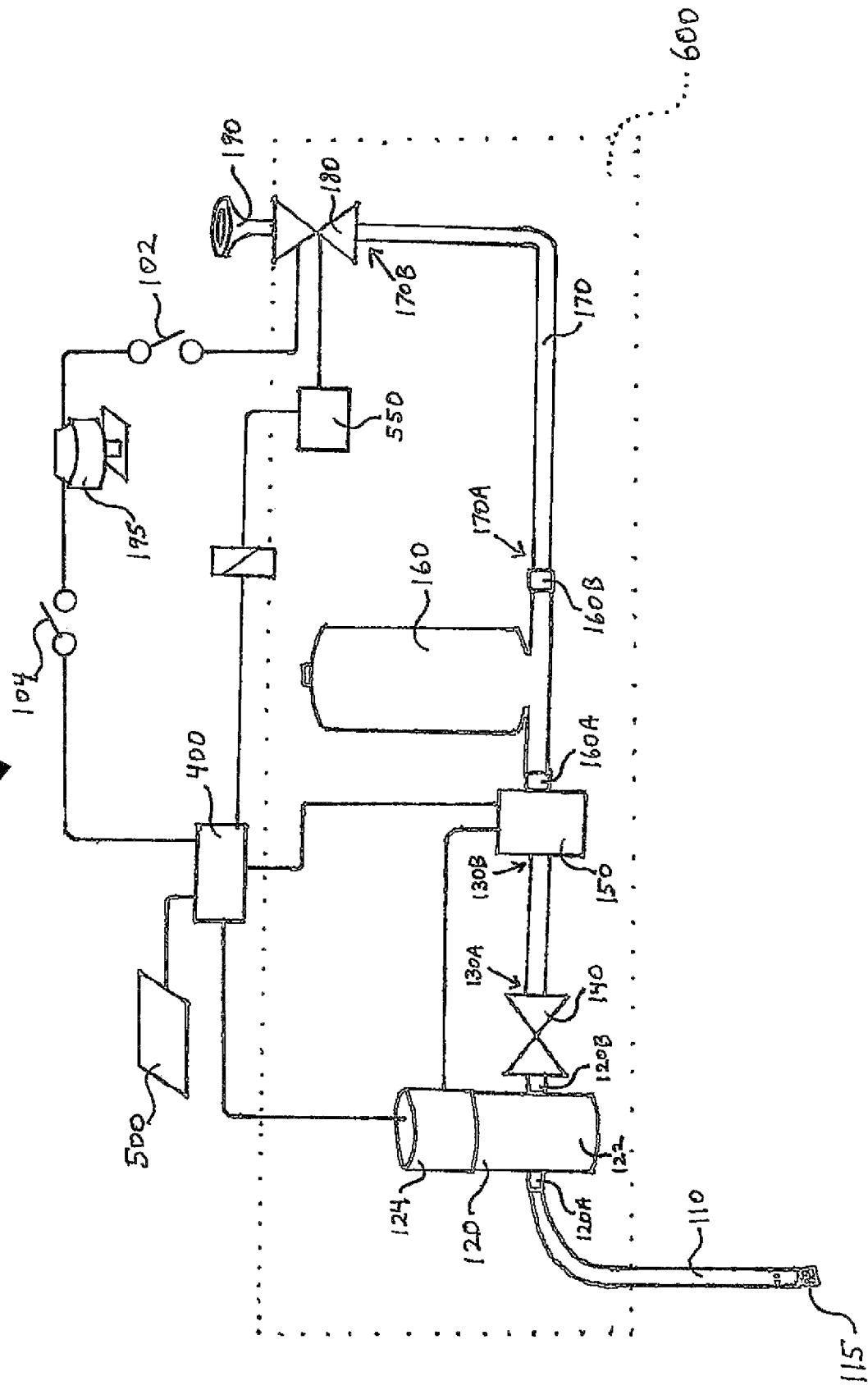
FIG. 2 is a plan view showing the non-limiting exemplary embodiment of FIG. 1.
Figure 3:
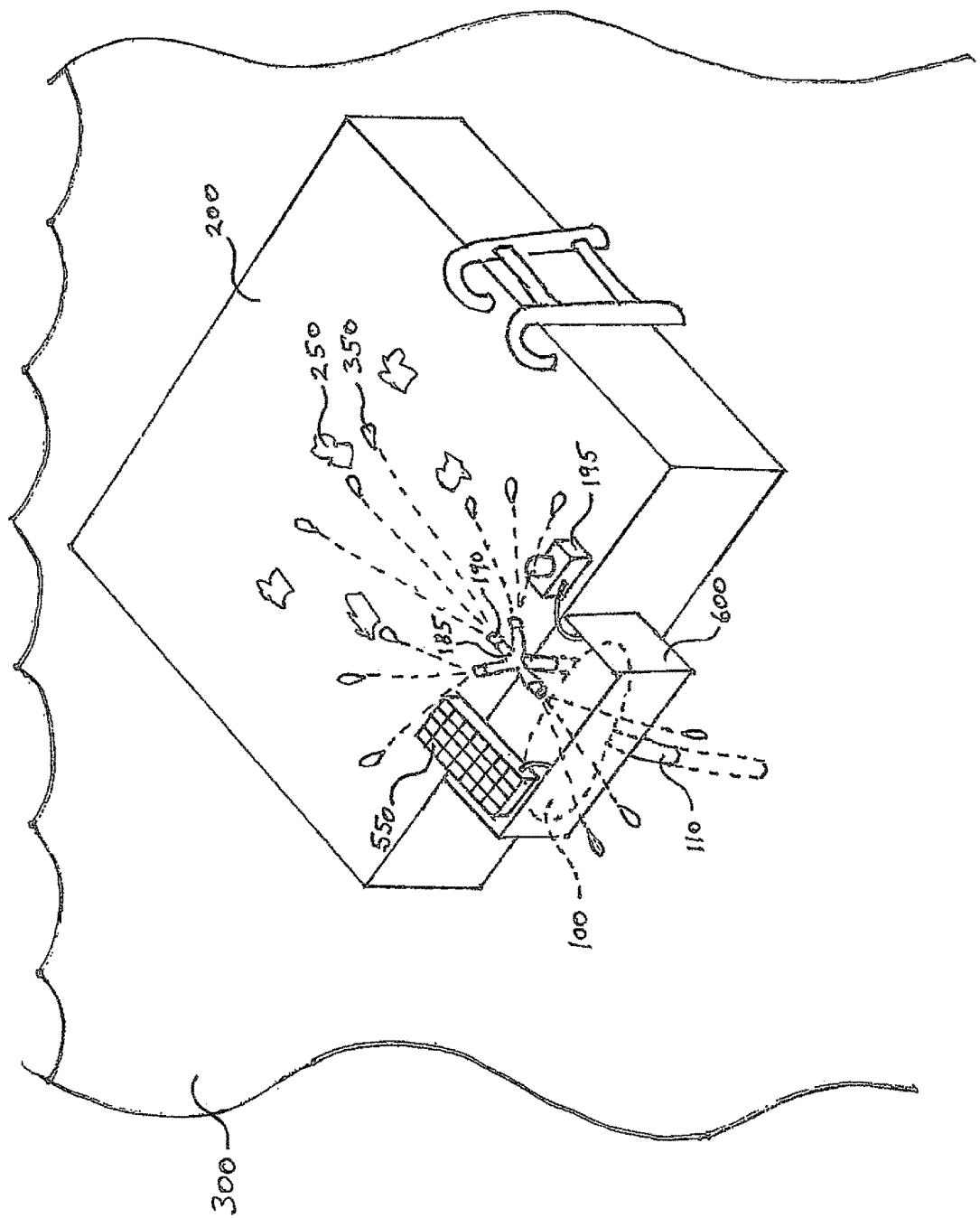
FIG. 3 is a perspective view showing a non-limiting exemplary embodiment of the inventive cleaning and deterrent device at least partially disposed within an optional encasement member, and wherein the cleaning and deterrent device is disposed upon a water apparatus in the form of a floating dock disposed upon a water body.
Figure 4:
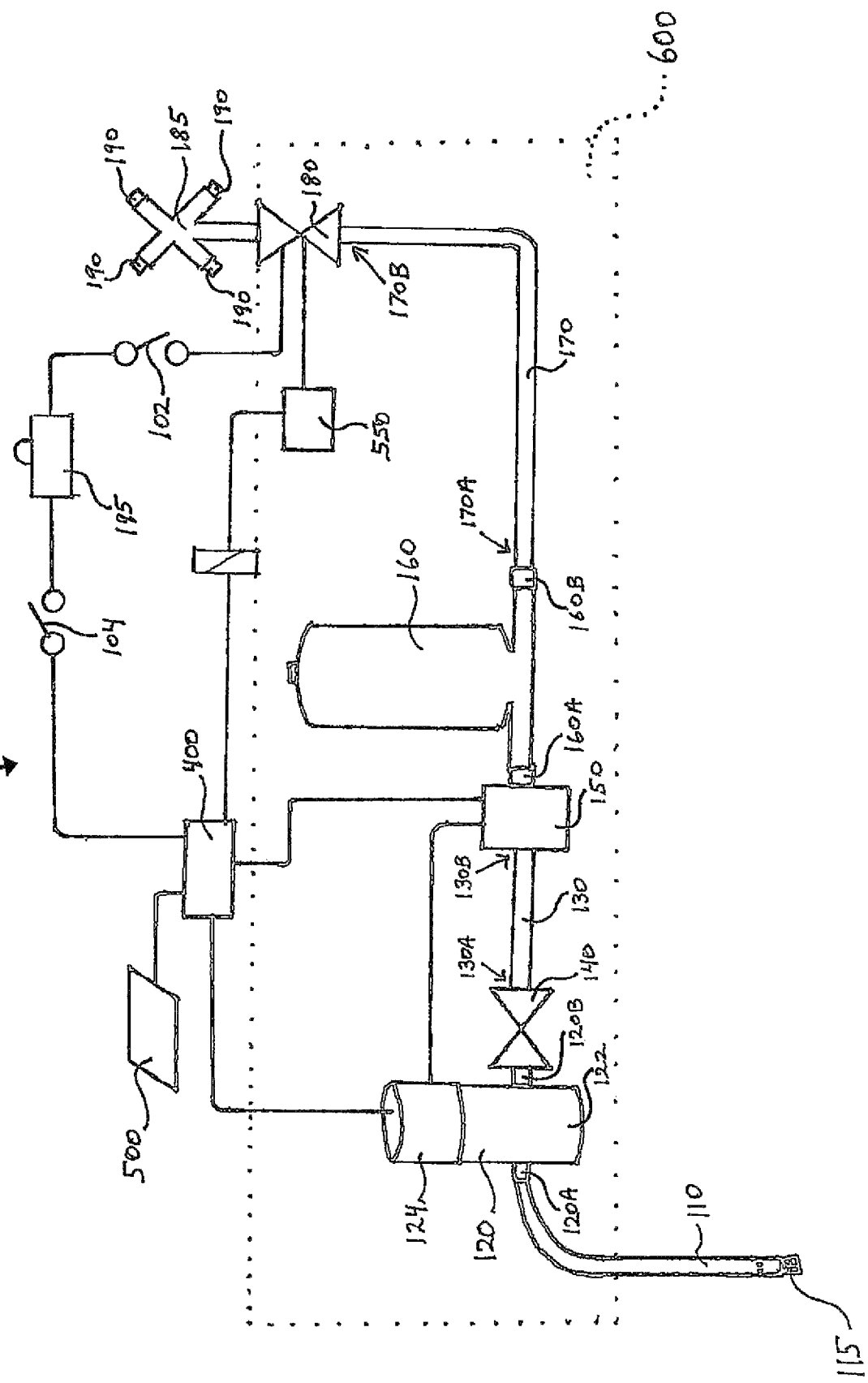
FIG. 4 is a plan view showing the non-limiting exemplary embodiment of FIG. 3.

With reference now to FIGS. 1, 3 and 5, in some embodiments, the inventive cleaning and deterrent device 100 can comprise an optional encasement member 600. Such encasement member 600 can at least partially surround or encase at least a portion of the device 100, which may typically include the pump member 120, the second transfer member 130, an optional check valve member 140, an optional pressure control member 150, the storage member 160, an optional shutoff valve member 180, and/or the power source member 400. The purpose of an optional encasement member 600 includes, but is not limited to, protection of the device 100 components, protection of users from the device 100 or components thereof, and aesthetics. Such encasement members 600 can be constructed of rigid and/or flexible materials, which can include plastics, Plexiglas, fiberglass, metals, wood, rubber, and the like, and combinations thereof. Suitable encasement members 600 include those known to persons having ordinary skill in the art, including containers, housings, bladders, and the like. In one non-limiting example, a rectangular wooden box was utilized as an optional encasement member 600 for the inventive cleaning and deterring device 100. In another non-limiting example, a cylindrical metallic housing was utilized as an optional encasement member 600 for the inventive cleaning and deterring device 100.

Returning now to FIGS. 1-6, in some embodiments, the inventive cleaning and deterrent device 100 can include an optional device switch 102. The ultimate purpose of such an optional device switch 102 is to control the operation of the device 100. In some embodiments, such optional device switch can deactivate the device 100 (such as when the water apparatus 200 is being used), such as by physical activation/deactivation of the switch (e.g., a toggle switch) and/or by wireless activation/deactivation of the switch typically in conjunction with electronic circuitry and software (e.g., control via an application program or "app"). In other embodiments, such optional device switch 102 can enable manual operation of the device 100 (e.g., to energize/de-energize the device 100, to cycle the device 100, etc.). In one non-limiting example, an optional device switch 102 was electrically wired between the power source member 400 and the pump member 120. In another non-limiting example, an optional device switch 102 was electrically wired between an optional motion sensor member 195 and an optional shutoff valve member 180. It should be understood that other electrical connections of an optional device switch 102 between electrical components of the inventive cleaning and deterrent device 100 which can engage and disengage the device 100 are also suitable without departing from the scope of the invention.

The invention also includes a method of making an inventive cleaning and deterrent device 100 of the present disclosure. Such method can comprise:

A. providing a first transfer member 110 having a first end 110A and a second end 110B, a pump member 120 having an inlet element 120A and an outlet element 120B, a second transfer member 130 having a first end 130A and a second end 130B, a storage member 160 having an inlet element 160A and an outlet element 160B; a third transfer member 170 having a first end 170A and a second end 170B, a nozzle member 190 having an inlet end or element 190A and an outlet end 190B, and a power source member 400;

B. connecting the second end 110B of the first transfer member 110 to the inlet element of the pump member 120;

C. connecting the first end 130A of the second transfer member 130 to the outlet element 120B of the pump member 120;

D. connecting the second end 130B of the second transfer member 130 to the inlet element 160A of the storage member 160;

E. connecting the first end 170A of the third transfer member 170 to the outlet element 160A of the storage member 160;

F. connecting the second end 170B of the third transfer member 170 to the inlet end or element 190A of the nozzle member 190; and G. electrically connecting the pump member 120 to the power source member 400.

In some embodiments, the method can include providing an optional device switch 102 and electrically connecting the device switch 102 between the power source member 400 and the pump member 120. In some embodiments, the method can include providing an optional filter member 115 and connecting or otherwise coupling the filter member 115 to the first end 110A of the first transfer member 110. In some embodiments, the method can include providing an optional check valve member 140 and connecting the check valve member 140 between the pump member 120 and the storage member 160. In some embodiments, the method can include providing an optional pressure control member 150 and connecting the pressure control member 150 between the pump member 120 and the storage member 160. In some embodiments, the method can include providing an optional motion sensor member 195 and electrically connecting the motion sensor 195 member between the power source member 400 and the pump member 200. In some embodiments, the method can include providing an optional motion sensor member 195 and an optional electrical shutoff valve member 180, connecting the electrical shutoff valve member 180 between the storage member 160 and the nozzle member 190, and electrically connecting the motion sensor member 195 between the power source member 400 and the electrical shutoff valve member 180. In some embodiments, the method can include providing an optional charging member 500 and electrically connecting the charging member 500 to the power source member 400. In some embodiments, the method can include providing an optional header member 185 and connecting the header member 185 between the third transfer member 170 and the nozzle member 190. In some embodiments, the method can include providing an optional encasement member 600 and disposing at least a portion of the cleaning and deterrent device 100 within the encasement member 600.

In some embodiments, the power source member 400 can be in the form of rechargeable battery. In some embodiments, the method can further comprise providing an optional voltage control member 550 and electrically connecting the voltage control member 550 between the power source member 400 and the charging member 500. In some embodiments, the optional charging member 500 can be in the form of a solar panel.

In some embodiments, the method can further comprise providing an optional motion sensor member 195, an optional motion sensor switch 104 and an optional electrical shutoff valve member 180, connecting the electrical shutoff valve member 180 between the storage member 160 and the nozzle member 190, electrically connecting the motion sensor member 195 to the shutoff valve member 180, and electrically connecting the motion sensor switch 104 between the motion sensor member 195 and the power source member 400.

In some embodiments, the method can further comprise providing an optional electrical shutoff valve member 180 and an optional voltage control member 550, connecting the electrical shutoff valve member 180 between the storage member 160 and the nozzle member 190, and electrically connecting the voltage control member 550 between the electrical shutoff valve member 180 and the power source member 400.

The invention also includes a method of using the inventive cleaning and deterrent device 100. Such method can comprise:

A. providing a water apparatus 200;

B. disposing the water apparatus 200 into a water body 300, wherein the water body comprises cleaning water 350;

C. providing an inventive cleaning and deterrent device 100 comprising a first transfer member 110 having a first end 110A and a second end 110B, a pump member 120 having an inlet element 120A and an outlet element 120B, a second transfer member 130 having a first end 130A and a second end 130B, a storage member 160 having an inlet element 160A and an outlet element 160B; a third transfer member 170 having a first end 170A and a second end 170B, a nozzle member 190 having an inlet end or element 190A and an outlet end 190B, and a power source member 400;

D. disposing the cleaning and deterring device 100 upon the water apparatus 200, preferably at a location which minimizes use of the water apparatus 200 by a user;

E. positioning the nozzle member 190 such that cleaning water 350 from the water body 350 expelled by the cleaning and deterrent device 100 contacts a target area of the water apparatus 200 during operation of the device 100;

F. disposing the first end 110A of the first transfer member 110 into the water body 300; and G. energizing the device 100 via the power source 400.

wherein the second end 110B of the of the first transfer member 110 is connected to the inlet element 120A of the pump member 120; wherein the first end 130A of the second transfer member 130 is connected to the outlet element 120B of the pump member 120 and the second end 130B of the second transfer member 130 is connected to the inlet element 160A of the storage member 160; wherein the first end 170A of the third transfer member 170 is connected to the outlet element 160B of the storage member 160 and the second end 170B of the third transfer member 170 is connected to the inlet end or element 190A of the nozzle member 190; and wherein the pump member 120 is electrically connected to the power source member 400.

In some embodiments, the device 100 can include an optional device switch 102 electrically connected between the power source member 400 and the pump member 120. In some embodiments, the device 100 can include an optional filter member 115 connected to the first end 110A of the first transfer member 110. In some embodiments, the device 100 can include an optional check valve member 140 connected between the pump member 120 and the storage member 160. In some embodiments, the device 100 can include an optional pressure control member 150 connected between the pump member 120 and the storage member 120. In some embodiments, the device 100 can include an optional motion sensor member 195 electrically connected between the power source member 400 and the pump member 120. In some embodiments, the device 100 can include an optional motion sensor member 195 and an optional electrical shutoff valve member 180, wherein the electrical shutoff valve member 180 is connected between the storage member 160 and the nozzle member 190, and wherein the motion sensor member 195 is electrically connected between the power source member 400 and the electrical shutoff valve member 180. In some embodiments, the device 100 can include an optional charging member 500 electrically connected to the power source member 400. In some embodiments, the device 100 can include an optional header member 185 connected between the third transfer member 170 and the nozzle member 190. In some embodiments, the device 100 can include an optional encasement member 600 wherein at least a portion of the cleaning and deterrent device 100 is disposed therein.

In some embodiments, the power source member 400 is in the form of a rechargeable battery. In some embodiments, the cleaning and deterrent device 100 further comprises an optional voltage control member 550, wherein the voltage control member 550 is electrically connected between the power source member 400 and an optional charging member 500. In some embodiments, the optional charging member 500 is in the form of a solar panel.

In some embodiments, the cleaning and deterrent device 100 further comprises an optional motion sensor member 195, an optional motion sensor switch 104 and an optional electrical shutoff valve member 180, wherein the electrical shutoff valve member 180 is connected between the storage member 160 and the nozzle member 190, wherein the motion sensor member 195 is electrically connected between the electrical shutoff valve member 180 and the motion sensor switch 104, and wherein the motion sensor switch 140 is electrically connected to the power source member 400

In some embodiments, the cleaning and deterrent device 100 further comprises an optional electrical shutoff valve member 180 and an optional voltage control member 550, wherein the electrical shutoff valve member 180 is connected between the storage member 160 and the nozzle member 190, and wherein the voltage control member 550 is electrically connected between the electrical shutoff valve member 180 and the power source member 400.

The present invention may be better understood with reference to the following examples.

EXAMPLES

Example 1

A water apparatus 200 was provided in the form of a floating pier (e.g., swimming dock). The water apparatus 200 had a length of about 10 feet, a width of about 8 feet, and a height extending above the surface of a water body 300 when in use of about 14 inches. A non-limiting exemplary inventive cleaning and deterrent device 100 was then constructed.

A pump member 120 was provided in the form of a self-priming BAYITE Model No. BYT-7A102 diaphragm pump (available from Bayite) comprising a pumping element 122, a 12 volt electrical motor element 124, a 38 inch diameter inlet element 120A and a 38 inch diameter outlet element 120B. The pump member 120 further included a built-in adjustable 100 psi optional pressure control member 150 in the form of a pressure switch, which was adjusted to a setting of 80 psi, and a built-in optional check valve member 140. A first transfer member 110 was also provided in the form of braided nylon tubing having a first end 110A, a second end 110B, a length of about 3 feet and an inner diameter of about ⅜ inch. The second end 110B of the first transfer member 110 was connected to the inlet element 120A of the pump member 120 via a hose clamp. An optional filter member 115 in the form of a plastic coarse strainer having an outer diameter of about ⅜ inch (about 9.5 mm) was partially inserted into the first end 110A the first transfer member 110 and was held therein via friction. A second transfer member 130 was also provided in the form of braided nylon tubing having a first end 130A, a second end 130B, a length of about 6 inches and an inner diameter of about ⅜ inch. The first end 130A of the second transfer member 130 was connected to the outlet element 120B of the pump member 120 via a hose clamp.

A storage member 160 was provided in the form of an AMARINE MADE 0.75 liter, 125 psi, pre-pressurized (to 10 psi) accumulator tank comprising an internal bladder, a ½ inch diameter inlet element 160A and a ½ inch diameter outlet element 160B (ASIN B07QJYPHM3, available from Alfa Marine (Shanghai) Co., Ltd). The second end 130B of the second transfer member 130 was connected to the inlet element 160A of the storage member 160 via a ½ inch to ⅜ inch reducer and a hose clamp. The storage member 160 air bladder pressure was then checked to ensure an air pressure of 10 psi. A third transfer member 170 was also provided in the form of braided nylon tubing having a first end 170A, a second end 170B, a length of about 12 inches and an inner diameter of about ½ inch. The first end 170A of the third transfer member 170 was connected to the outlet element 160B of the storage member 160 via a hose clamp.

An optional shutoff valve member 180 was provided in the form of a 12 volt electrically controlled Type 2WS1-20-51V-B32 brass solenoid valve (available from Yuyao Shuntong Solenoid Valve Co., Ltd) comprising an inlet element 180A having a diameter of about ¾ inch and an outlet element 180B having a diameter of about ¾ inch. The second end 170B of the third transfer member 170 was connected to the inlet element 180A of the optional shutoff valve 180 via a ¾ inch to ½ inch reducer and a hose clamp. In addition, an optional motion sensor member 195 was provided in the form of a 140-degree HILETGO Model No. 3-01-1113 motion sensor (available from Shenzhen HiLetgo Technology Co., Ltd), along with an optional motion sensor on/off switch 104, and an optional device switch 102 for, inter alia, disengaging the inventive device 100 (such as when the water apparatus 200 is being used), manually cycling the device 100 (via opening the shutoff valve 180), etc., The motion sensor switch 104 was electrically connected between the power source member 400 (described below) and the motion sensor member 195 via electrical wiring. Then the device switch 102 was electrically connected between the motion sensor member 195 and the shutoff valve member 180 via electrical wiring.

A power source member 400 was provided in the form of a compact rechargeable battery. The battery was an LPF-MAX LiFePO4 12.8 volt 6 Ah lithium iron phosphate deep cycle battery (available from Dongguan Feichi New Energy Technology Co., Ltd., having a place of business located in Dongguan, Guangdong, China) and having a length of about 5.9 inches (15 cm), a width of about 2.4 inches (6.1 cm) and a height of about 3.3 inches (8.3 cm). In addition, an optional charging member 500 was provided in the form of a LIXADA 20W, 12 volt DC, 500 milliamp monocrystalline silicon portable solar cell panel (available from Lixada Inc.). The charging member 500 (i.e., solar panel) was placed onto a wooden support pane having a length of about 12 inches, a width of about 8 inches and a height (thickness) of about 1 inch, and was secured thereto via screws, thus forming a charging member 500/support pane combination. The charging member 500 was electrically connected to the power source member 400 (i.e., battery) via electrical wiring.

In addition, an optional voltage control member 550 was provided in the form of an EFANS STUDIO digital LED voltage regulator cut off protection board (available from Efans Studio). The outlet terminal of the voltage control member 550 (i.e., load connection) was electrically connected to the shutoff valve member 180 (in parallel with the motion sensor member 195) via electrical wiring, and the input terminal of the voltage control member 550 (i.e., line connection) was electrically connected to the power source member 400 through a relay via electrical wiring.

An optional encasement member 600 was also provided. The optional encasement member 600 was in the form of a six-sided box constructed of wood (i.e., a horizontal bottom side portion, a removable horizontal top side portion, and four (4) vertical side portions disposed about the perimeter of the top and bottom side portions), and having an interior volume at least large enough to accommodate the device 100, including the power source member 400 (i.e., battery) thereof. More particularly, the optional encasement member 600 had an interior length of about 18 inches, an interior width of about 6 inches, and an interior height of about 12 inches. In addition, a circular aperture having a diameter of about ⅜ inch was disposed through the bottom side portion of the encasement member 600, and a circular aperture having a diameter of about ½ inch was disposed at about a 15-degree angle through the top side portion of the encasement member 600 (configured such that a protrusion through the angled aperture generally faced the center point of the water apparatus 200 top side surface). With the top side portion of the encasement member 600 removed, the optional encasement member 600 was attached to a side portion of the water apparatus 200 (at approximately the center point thereof), configured such that the entire external surface of the top side portion of the encasement member 600 (when in place) was generally planarly aligned with the planar top side portion of the water apparatus 200, and the bottom side portion of the encasement member 600 was generally located just above the water body 300 surface when the water apparatus was in use. In addition, with the top side portion of the encasement member 600 still removed, the power source member 400 and the device 100 as constructed thus far (except for the device switch 102, the motion sensor member 195, the motion sensor switch 104 and the charging member 500/support pane combination) were placed into the encasement member 600 and secured therein via brackets and screws such that the first end 110A of the first transfer member 110 and optional filter member 115 protruded through the aperture of the bottom side portion of the encasement member 600 (extending externally approximately 35 inches in a generally downward direction), and about one-half of the reducer connected to the outlet element 180B of the optional shutoff valve 180 protruded externally at about a 15-degree angle through the angled aperture of the top side portion of the encasement member 600 (i.e., after the top side portion had been placed onto the encasement member 600).

The top side portion of the encasement member 600 was then aligned and placed upon the top of the encasement member 600. A slight gap was available around the perimeter thereof to allow electrical wiring to extend externally through the encasement member 600. The device switch 102 and the motion sensor switch 104 were each then fastened to the top side of the encasement member 600 via screws. Likewise, the charging member 500/support pane combination was fastened to the top side of the encasement member 600 via screws, such that the solar panel faced generally upward and a portion of the combination extended onto the top side surface of the water apparatus 200. In addition, the motion sensor member 195 was attached to the top side surface of the water apparatus 200 using screws at a location proximate to the encasement member 600 and configured such that the sensing area of the motion sensor was maximized with respect to the water apparatus 200 (i.e., aimed generally toward the center point of the planar top side surface of the water apparatus 200).

Finally, a nozzle member 190 was provided in the form of an ORBIT Model No. 54071 brass pop-up fan spray nozzle (available from Orbit Irrigation Products, Inc.) having a ½ inch diameter inlet end 190A and a relatively open (about 1.25 inch diameter) outlet end 190B, wherein the pop-up portion had been removed therefrom. The nozzle member 190 was threaded onto the exposed portion of the reducer (which was connected to the outlet element 180B of the optional shutoff valve 180 and protruded through the angled aperture of the top side portion of the encasement member 600 at about a 15-degree angle) such that the cleaning water 350 emitted therefrom substantially targeted the top side surface of the water apparatus 200 with maximum coverage, thus completing construction and installation of the inventive cleaning and deterrent device 100 of this Example 1. The installed device 100 was similar to the device 100 shown in FIGS. 1-2.

The water apparatus 200 with the inventive cleaning and deterrent device 100 attached thereto was placed into a water body 300. Accordingly, the first end 110A of the first transfer member 110 extended downward into the water body 300 to a length of about 35 inches. With the power source member 400 fully charged, the pump member 200 was electrically connected thereto via electrical wiring, thus allowing electricity to energize the device 100. The pump member 120 immediately initiated and ran until the storage member 160 was filled with cleaning water 350 and reached an internal water pressure of about 80 psi, at which point the pump member 120 ceased operation. The device switch 102 as then placed into the "on" position. Next, the motion sensor switch was placed into the "on" position, thus electrically energizing the motion sensor member 195. A human hand was then waved in front of the sensing component of the motion sensor member 195. Immediately, the shutoff valve member 180 opened and approximately 0.75 liters of cleaning water was ejected from the nozzle member 190 in a generally upward direction (at about a 15-degree angle) into the air, which then spread-out and landed upon a majority of the planar top side surface of the water apparatus. The pump member 120 then re-engaged until the storage member 160 was refilled and the maximum water pressure setting was reached. Some foulment 250 in the form of small miscellaneous debris was sprinkled onto the planar top side surface of the water apparatus 200, and the cleaning process was repeated four additional times, with each "cycle" resulting in a successful operation of the inventive cleaning and deterrent device 100 of this Example 1, and furthermore washing away the foulment 250 from the top side surface of the water apparatus. In addition, it was observed that the device 100 also periodically cycled on its own when the power source member 400 (i.e., battery) electrical charge reached 100%, which helped to prevent overcharging of the power source member 400.

Example 2

A water apparatus 200 was provided in the form of a floating pier (e.g., swimming dock). The water apparatus 200 had a length of about 10 feet, a width of about 8 feet, and a height extending above the surface of a water body 300 when in use of about 14 inches. A non-limiting exemplary inventive cleaning and deterrent device 100 was then constructed.

A pump member 120 was provided in the form of a self-priming BAYITE Model No. BYT-7A102 diaphragm pump (available from Bayite) comprising a pumping element 122, a 12 volt electrical motor element 124, a ⅜ inch diameter inlet element 120A and a 38 inch diameter outlet element 120B. The pump member 120 further included a built-in adjustable 100 psi optional pressure control member 150 in the form of a pressure switch, which was adjusted to a setting of 80 psi, and a built-in optional check valve member 140. A first transfer member 110 was also provided in the form of braided nylon tubing having a first end 110A, a second end 110B, a length of about 3 feet and an inner diameter of about ⅜ inch. The second end 110B of the first transfer member 110 was connected to the inlet element 120A of the pump member 120 via a hose clamp. An optional filter member 115 in the form of a plastic coarse strainer having an outer diameter of about ⅜ inch (about 9.5 mm) was partially inserted into the first end 110A the first transfer member 110 and was held therein via friction. A second transfer member 130 was also provided in the form of braided nylon tubing having a first end 130A, a second end 130B, a length of about 6 inches and an inner diameter of about ⅜ inch. The first end 130A of the second transfer member 130 was connect to the outlet element 120B of the pump member 120 via a hose clamp.

A storage member 160 was provided in the form of an AMARINE MADE 0.75 liter, 125 psi, pre-pressurized (to 10 psi) accumulator tank comprising an internal air bladder, a ½ inch diameter inlet element 160A and a ½ inch diameter outlet element 160B (ASIN B07QJYPHM3, available from Alfa Marine (Shanghai) Co., Ltd). The second end 130B of the second transfer member 130 was connected to the inlet element 160A of the storage member 160 via a ½ inch to ⅜ inch reducer and a hose clamp. The storage member 160 air bladder pressure was then checked to ensure an air pressure of 10 psi. A third transfer member 170 was also provided in the form of braided nylon tubing having a first end 170A, a second end 170B, a length of about 12 inches and an inner diameter of about ½ inch. The first end 170A of the third transfer member 170 was connected to the outlet element 160B of the storage member 160 via a hose clamp.

An optional shutoff valve member 180 was provided in the form of a 12 volt electrically controlled Type 2WS1-20-51V-B32 brass solenoid valve (available from Yuyao Shuntong Solenoid Valve Co., Ltd) comprising an inlet element 180A having a diameter of about ¾ inch and an outlet element 180B having a diameter of about ¾ inch. The second end 170B of the third transfer member 170 was connected to the inlet element 180A of the optional shutoff valve 180 via a ¾ inch to ¼ inch reducer and a hose clamp. In addition, an optional motion sensor member 195 was provided in the form of a TOP GREENER Model No. MPC-50L 360-degree low voltage motion sensor (available from Top Greener Inc.), along with an optional motion sensor on/off switch 104, and an optional device switch 102 for, inter alia, disengaging the inventive device 100 (such as when the water apparatus 200 is being used), manually cycling the device 100 (via opening the shutoff valve 180), etc., The motion sensor switch 104 was electrically connected between the power source member 400 (described below) via electrical wiring and the motion sensor member 195 via electrical wiring. Then the device switch 102 was electrically connected between the motion sensor member 195 and the shutoff valve member 180 via electrical wiring.

A power source member 400 was provided in the form of a compact rechargeable battery. The battery was an LPF-MAX LiFePO4 12.8 volt 6 Ah lithium iron phosphate deep cycle battery (available from Dongguan Feichi New Energy Technology Co., Ltd.) having a length of about 5.9 inches (15 cm), a width of about 2.4 inches (6.1 cm) and a height of about 3.3 inches (8.3 cm). In addition, an optional charging member 500 was provided in the form of a LIXADA 20W, 12 volt DC, 500 milliamp monocrystalline silicon portable solar cell panel (available from Lixada Inc.). The charging member 500 (i.e., solar panel) was placed onto a wooden support pane having a length of about 12 inches, a width of about 8 inches and a height (thickness) of about 1 inch, and was secured thereto via screws, thus forming a charging member 500/support pane combination. The charging member 500 was electrically connected to the power source member 400 (i.e., battery) via electrical wiring.

In addition, an optional voltage control member 550 was provided in the form of an EFANS STUDIO digital LED voltage regulator cut off protection board (available from Efans Studio). The outlet terminal of the voltage control member 550 (i.e., load connection) was electrically connected to the shutoff valve member 180 (in parallel with the motion sensor member 195) via electrical wiring, and the input terminal of the voltage control member 550 (i.e., line connection) was electrically connected to the power source member 400 through a relay via electrical wiring.

An optional encasement member 600 was also provided. The optional encasement member 600 was in the form of a six-sided box constructed of wood (i.e., a horizontal bottom side portion, a removable horizontal top side portion, and four (4) vertical side portions disposed about the perimeter of the top and bottom side portions), and having an interior volume at least large enough to accommodate the device 100, including the power source member 400 (i.e., battery) thereof. More particularly, the optional encasement member 600 had an interior length of about 18 inches, an interior width of about 6 inches, and an interior height of about 12 inches. In addition, a circular aperture having a diameter of about ⅜ inch was disposed through the bottom side portion of the encasement member 600, and a circular aperture having a diameter of about ½ inch was disposed at about a 15-degree angle through the top side portion of the encasement member 600 (configured such that a protrusion through the angled aperture generally faced the center point of the water apparatus 200 top side surface). With the top side portion of the encasement member 600 removed, the optional encasement member 600 was attached to a side portion of the water apparatus 200 (at approximately the center point thereof), configured such that the entire external surface of the top side portion of the encasement member 600 (when in place) was generally planarly aligned with the planar top side portion of the water apparatus 200, and the bottom side portion of the encasement member 600 was generally located just above the water body 300 surface when the water apparatus was in use. In addition, with the top side portion of the encasement member 600 still removed, the power source member 400 and the device 100 as constructed thus far (except for the device switch 102, the motion sensor member 195, the motion sensor switch 104, and the charging member 500/support pane combination) were placed into the encasement member 600 and secured therein via brackets and screws such that the first end 110A of the first transfer member 110 and optional filter member 115 protruded through the aperture of the bottom side portion of the encasement member 600 (extending externally approximately 35 inches in a generally downward direction), and about one-half of the reducer connected to the outlet element 180B of the optional shutoff valve 180 protruded externally at about a 15-degree angle through the angled aperture of the top side portion of the encasement member 600 (i.e., after the top side portion had been placed onto the encasement member 600).

The top side portion of the encasement member 600 was then aligned and placed on top of the encasement member 600. A slight gap was available around the perimeter thereof to allow electrical wiring to extend externally through the encasement member 600. The device switch 102 and the motion sensor switch 104 were each then fastened to the top side of the encasement member 600 via screws. Likewise, the charging member 500/support pane combination was fastened to the top side of the encasement member 600 via screws, such that the solar panel faced generally upward and a portion of the combination extended onto the top side surface of the water apparatus 200. In addition, the motion sensor member 195 was attached to the top side surface of the water apparatus 200 using screws at a location proximate to the encasement member 600.

A header member 185 was provided in the form of a ¼ inch 304 stainless steel female BSP threaded pipe fitting 5-way equal cross connector (having one (1) inlet and four (4) outlets) (Part Number FHW-PPFT-241120-00802, available from e-ppfittings), along with four (4) spray nozzle members 190 in the form of MROMAX ¼ inch MIP 80 degree standard VeeJet flat fan spray nozzles (available from Lawson Products, Inc.). A spray nozzle member 190 was connected to each of the outlets of the header member 185, and then the inlet of the header member 185 was threaded onto the exposed portion of the reducer (which was connected to the outlet element 180B of the optional shutoff valve 180 and protruded through the angled aperture of the top side portion of the encasement member 600 at about a 15-degree angle), thus completing construction and installation of the inventive cleaning and deterrent device 100 of this Example 2. The installed device 100 was similar to the device 100 shown in FIGS. 3-4.

The water apparatus 200 with the inventive cleaning and deterrent device 100 attached thereto was placed into a water body 300. Accordingly, the first end 110A of the first transfer member 110 extended downward into the water body 300 to a length of about 35 inches. With the power source member 400 fully charged, the pump member 200 was electrically connected thereto via electrical wiring, thus allowing electricity to energize the device 100. The pump member 120 immediately initiated and ran until the storage member 160 was filled with cleaning water 350 and reached an internal water pressure of about 80 psi, at which point the pump member 120 ceased operation. The device switch 102 as then placed into the "on" position. Next, the motion sensor switch was placed into the "on" position, thus electrically energizing the motion sensor member 195, whereupon human body movement was detected by the sensing component of the 360-degree motion sensor member 195. Immediately, the shutoff valve member 180 opened and approximately 0.75 liters of cleaning water was ejected through the nozzle members 190 in four (4) directions, each in a fan-like pattern. The pump member 120 then re-engaged until the storage member 160 was refilled and the maximum water pressure setting was again reached. It was noted that, due to the particular angled configuration of the header member 185 in this Example 2, only three of the four fan-like spray patterns were disposed onto the planar top side surface of the water apparatus 200, while the fourth nozzle member 190 expelled cleaning water 350 in an upward direction. Nonetheless, some foulment 250 in the form of small miscellaneous debris was sprinkled onto the planar top side surface of the water apparatus 200, and the cleaning process was repeated four additional times, with each "cycle" resulting in a successful operation of the inventive cleaning and deterrent device 100 of this Example 2, and furthermore washing away the foulment 250 from the top side surface of the water apparatus. In addition, it was observed that the device 100 also periodically cycled on its own when the power source member 400 (i.e., battery) electrical charge reached 100%, which helped to prevent overcharging of the power source member 400.

Example 3

A different water apparatus 200 (as compared to Example 1 and Example 2) was provided in the form of a floating pier (e.g., swimming dock). The water apparatus 200 of this Example 3 had a length of about 10 feet, a width of about 8 feet, and a height extending above the surface of a water body 300 when in use of about 14 inches. In addition, the water apparatus of this Example 3 comprised a pop-up table member 610 located at the approximate center point of the top side surface of the water apparatus 200. The pop-up table member 610 comprised a plastic, circular, horizontally planar table-top element 620 having a diameter of about 24 inches and a thickness of about 5 inches, and further comprised a metallic, hollow, vertical cylindrical housing element 630 having a diameter of about 2 inches and a fully extended vertical length (i.e., height) of about 12 inches above the top side planar surface of the water apparatus 200, wherein the table-top element 620 was disposed upon, and supported by, the housing element 630. In addition, the housing element 630 extended further downward through the water apparatus 200 such that the bottom end of the housing element 630 was open to the water body 300 when the water apparatus 200 was in use.

The pop-up table member 610 was placed into its fully extended configuration, and the table-top element 620 was unfastened and removed from the housing element 630, exposing an open top end thereof. Then, four (4) openings or apertures 635, each having a diameter of about ¾ inch, were drilled into the housing element 630 equidistant around the circumference thereof, each at a height of about 1 inch above the planar top side surface of the water apparatus 200, such that each opening 635 generally faced toward a corner portion of the rectangular-shaped water apparatus 200. In addition, a circular hole having a diameter of about 1.25 inch was drilled through the approximate center point of the table-top element 620 (i.e., from the top side through the bottom side thereof).

A third transfer member 170 was provided in the form of braided nylon tubing having a first end 170A, a second end 170B, a length of about 24 inches and an inner diameter of about ½ inch. The third transfer member 170 was cut into two (2) segments 170', wherein the first segment had a first end 170A', a second end 170B' and a length of about 4 inches, and wherein the second segment had a first end 170A", a second end 170B" and a length of about 20 inches, thus forming a third transfer member 170 comprising segments 170'. An optional header member 185 was also provided in the form of a ¼ inch 304 stainless steel female BSP threaded pipe fitting 5 way equal cross connector (having one (1) inlet and four (4) outlets configured in 90-degree angles with respect to each other (i.e., pointing in four (4) directions)) (Part Number FHW-PPFT-241120-00802, available from e-ppfittings). The second end 170B" of the second segment of the third transfer member 170 was connected to the inlet of the header member 185 via a ½ inch to ¼ inch reducer and a hose clamp. Next, the header 185 was disposed into the housing element 630 and aligned such that each outlet of the header member 185 was generally centered within each of the respective openings 635 of the housing element 630, whereinafter the header member 185 was secured therein via brackets and bolts such that the first end 170A" of the second segment of the third transfer member 170 extended from the top end of the housing element 630 by a length of approximately 9 inches. In addition, four (4) threaded spray nozzle members 190 were provided in the form of MROMAX ¼ inch MIP 80 degree standard VeeJet flat fan spray nozzles (available from Lawson Products, Inc.). Each spray nozzle member 190 was connected to a respective outlet of the header member 185 by inserting each nozzle member 190 through a respective opening 635 in the housing element 630 and into a respective outlet of the header member 185.

Next, the table-top element 620 was aligned and removably re-fastened onto the top end of the housing element 630 such that the first end 170A" of the second segment of the third transfer member 170 extended through the drilled hole of the table-top element 620 by a length of approximately 4 inches. Accordingly, the pop-up table member 610 (i.e., the table-top element 620 and the housing element 630) of this Example 3 functioned as an optional encasement member 600.

A pump member 120 was provided in the form of a self-priming BAYITE Model No. BYT-7A102 diaphragm pump (available from Bayite) comprising a pumping element 122, a 12 volt electrical motor element 124, a ⅜ inch diameter inlet element 120A and a ⅜ inch diameter outlet element 120B and was placed onto the planar top side surface of the table-top element 620 of the pop-up table member 610. The pump member 120 further included a built-in adjustable 100 psi optional pressure control member 150 in the form of a pressure switch, which was adjusted to a setting of 80 psi, and a built-in optional check valve member 140. A first transfer member 110 was also provided in the form of braided nylon tubing having a first end 110A, a second end 110B, a length of about 3 feet and an inner diameter of about ⅜ inch. The second end 110B of the first transfer member 110 was connected to the inlet element 120A of the pump member 120 via a hose clamp. An optional filter member 115 in the form of a plastic coarse strainer having an outer diameter of about ⅜ inch (about 9.5 mm) was partially inserted into the first end 110A the first transfer member 110 and was held therein via friction. A second transfer member 130 was also provided in the form of braided nylon tubing having a first end 130A, a second end 130B, a length of about 6 inches and an inner diameter of about ⅜ inch. The first end 130A of the second transfer member 130 was connect to the outlet element 120B of the pump member 120 via a hose clamp.

A storage member 160 was provided in the form of an AMARINE MADE 0.75 liter, 125 psi, pre pressurized (to 10 psi) accumulator tank comprising an internal air bladder, a ½ inch diameter inlet element 160A and a ½ inch diameter outlet element 160B (ASIN B07QJYPHM3, available from Alfa Marine (Shanghai) Co., Ltd) and was placed onto the planar top side surface of the table-top element 620 of the pop-up table member 610. The storage member 160 air bladder pressure was then checked to ensure an air pressure of 10 psi. The second end 130B of the second transfer member 130 was connected to the inlet element 160A of the storage member 160 via a ½ inch to ⅜ inch reducer and a hose clamp. In addition, an optional ½ inch tee 106 (i.e., having one (1) inlet, one (1) inline outlet and one (1) perpendicular outlet) was connected to the outlet element 160B of the storage member 160. In addition, a conventional garden hose faucet 108 with a manual shutoff valve was connected to the perpendicular outlet of the tee 106, to which a garden hose could be connected for use as a manual wash-up device.

The first end 170A' of the first segment of the third transfer member 170 was then connected to the inline outlet of the tee 106 via a hose clamp. An optional shutoff valve 180 was provided in the form of a 12 volt electrically controlled Type 2WS1-20-51V-B32 brass solenoid valve (available from Yuyao Shuntong Solenoid Valve Co., Ltd) comprising an inlet element 180A having a diameter of about ¾ inch and an outlet element 180B having a diameter of about ¾ inch. The second end 170B' of the first segment of the third transfer member 170 was connected to the inlet element 180A of the shutoff valve member 180 via a ¾ inch to ½ inch reducer and a hose clamp. Then the first end 170A" of the second segment of the third transfer member 170 was then connected to the outlet element 180B of the shutoff valve member 180 via a ¾ inch to ½ inch reducer and a hose clamp. Next, the first end 110A of the first transfer member 110 (and attached filter member 115) was carefully inserted through the table-top element 620 and the housing element 630, and past the header member 185, such that the first end 110A of the first transfer member 110 extended externally from the bottom side of the water apparatus in a generally downward direction.

A power source member 400 was provided in the form of a compact rechargeable battery. The battery was an LPF-MAX LiFePO4 12.8 volt 6 Ah lithium iron phosphate deep cycle battery (available from Dongguan Feichi New Energy Technology Co., Ltd.) having a length of about 5.9 inches (15 cm), a width of about 2.4 inches (6.1 cm) and a height of about 3.3 inches (8.3 cm) and placed onto the planar top side surface of the table-top element 620 of the pop-up table member 610. In addition, an optional charging member 500 was provided in the form of a LIXADA 20W, 12 volt DC, 500 milliamp monocrystalline silicon portable solar cell panel (available from Lixada Inc.). The charging member 500 (i.e., solar panel) was fitted onto a wooden support pane having a length of about 12 inches, a width of about 8 inches and a height (thickness) of about 1 inch, and was secured thereto via screws, thus forming a charging member 500/support pane combination. The charging member 500/support pane combination was placed onto the planar top side of the table-top element 620 with the charging member 500 (i.e., solar panel) facing generally upward, whereinafter the charging member 500 was electrically connected to the power source member 400 (i.e., battery) via electrical wiring.

An optional voltage control member 550 was provided in the form of an EFANS STUDIO digital LED voltage regulator cut off protection board (available from Efans Studio). The voltage control member 550 was placed onto the planar top side of the table-top element 620. The outlet terminal of the voltage control member 550 (i.e., load connection) was then electrically connected to the shutoff valve member 180 via electrical wiring, and the input terminal of the voltage control member 550 (i.e., line connection) was electrically connected to the power source member 400 through a relay via electrical wiring.

An optional motion sensor member 195 was provided in the form of a TOP GREENER Model No. MPC-50L 360-degree low voltage motion sensor (available from Top Greener Inc.), along with an optional motion sensor on/off switch 104. The motion sensor member 195 was fastened to the bottom side of the table-top element 620 using screws, such that the dome-shaped sensor element of the motion sensor member 195 was facing in a downward direction. The motion sensor switch 104 (set in the "off" position) was then electrically connected between the input terminal of the motion sensor member 195 (line connection) and the power source member 400 via electrical wiring.

An optional device switch 102 was also provided for, inter alia, disengaging the inventive device 100 (such as when the water apparatus 200 is being used), manually cycling the device 100 (via opening the shutoff valve 180), etc. The device switch 102 (set in the "off" position) was electrically connected between the outlet terminal of the motion sensor member 195 (load connection) and the shutoff valve member 180 via electrical wiring, thus completing construction and installation of the inventive cleaning and deterrent device 100 of this Example 3. The installed device 100 was similar to the device 100 shown in FIGS. 5-6.

The water apparatus 200 with the inventive cleaning and deterrent device 100 attached thereto was then placed into a water body 300. With the power source member 400 fully charged, the pump member 200 was electrically connected to the power source member 400 via electrical wiring, thus allowing electricity to energize the device 100. The pump member 120 immediately initiated and ran until the storage member 160 was filled with cleaning water 350 and reached an internal water pressure of about 80 psi, at which point the pump member 120 ceased operation. The device switch 102 was placed into the "on" position. Then, the motion sensor switch was placed into the "on" position, thus electrically energizing the motion sensor member 195, whereupon human body movement was detected by the sensing component of the motion sensor member 195. Immediately, the shutoff valve member 180 opened and approximately 0.75 liters of cleaning water was ejected from the nozzle members 190 in four (4) directions (broadly towards the corner portions of the water apparatus 200), each in a fan-like pattern, which collectively substantially covered the entire planar top side surface of the water apparatus 200 in an outward direction (i.e. outward from the encasement member 600 located in the approximate center of the water apparatus 200). The pump member 120 then re-engaged until the storage member 160 was refilled and the maximum internal water pressure setting was reached. Next, some foulment 250 in the form of small miscellaneous debris was sprinkled onto the planar top side surface of the water apparatus 200 in various locations, and the cleaning process was repeated four additional times, with each "cycle" resulting in a successful operation of the inventive cleaning and deterrent device 100 of this Example 3, and furthermore washing away the foulment 250 from the top side surface of the water apparatus in all directions. In addition, it was observed that the device 100 also periodically cycled on its own when the power source member 400 (i.e., battery) electrical charge reached 100%, which helped to prevent overcharging of the power source member 400.

It should be understood that in further versions of this Example 3, various components (e.g., the device switch 102, the motion sensor switch 104, the pump member 120, the storage member 160, the shutoff valve member 180, the power source member 400, the charging member 500/support pane combination, etc.) could be fastened to the table-top element 620, the housing element 630 or the water apparatus 200 without departing from the scope of the invention. In other version of this Example 3, the circular hole drilled through the table-top element 620 could be enlarged, or "compartments" could be disposed into the table-top element 620, to accommodate the various components referenced above without departing from the scope of the invention. In yet other versions of this Example 3, the housing element 630 could have a larger diameter such that one or more of the various components (e.g., the device switch 102, the motion sensor switch 104, the pump member 120, the storage member 160, the shutoff valve member 180, the power source member 400, etc.) could be disposed within the housing element 630 without departing from the scope of the invention. In still other versions of this Example 3, a transverse (horizontal) hole could be drilled through the table-top element 620 from the outer perimeter towards the center, and a suitably sized piping extension could be disposed through the hole and connected between the tee 106 and the garden hose faucet 108 without departing from the scope of the invention.

It will be appreciated that details of the foregoing examples, given for purposes of illustration, are not to be construed as limiting the scope of the present invention. Although only a few exemplary embodiments of the present invention have been described in detail above, persons having skill in the art will readily appreciate that many modifications are possible in the examples without materially departing from the novel teachings and advantages of this invention. For example, features described in relation to one example may be incorporated into any other example of the invention.

Accordingly, all such modifications are intended to be included within the scope of the present invention, which is defined in the following claims and all equivalents thereto. Further, it is recognized that many embodiments may be conceived that do not achieve all of the advantages of some embodiments, particularly of the desirable embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense.

What is claimed is:

1. A cleaning and deterrent device for use with a water apparatus disposed within a water body, comprising a first transfer member having a first end and a second end, a pump member having an inlet element and an outlet element, a second transfer member having a first end and a second end, a storage member having an inlet element and an outlet element, a third transfer member having a first end and a second end, a nozzle member having an inlet end and an outlet end, a power source member, a motion sensor member capable of detecting movement, and a shutoff valve member capable of allowing and preventing a cleaning water flow within the cleaning and deterrent device;

wherein the water body comprises cleaning water;

wherein the first end of the first transfer member is disposed into the water body and the second end of the of the first transfer member is connected to the inlet element of the pump member;

wherein the first end of the second transfer member is connected to the outlet element of the pump member and the second end of the second transfer member is connected to the inlet element of the storage member;

wherein the first end of the third transfer member is connected to the outlet element of the storage member and the second end of the third transfer member is connected to the inlet end of the nozzle member;

wherein the pump member is electrically connected to the power source member;

wherein the cleaning and deterrent device can withdraw cleaning water from the water body via the first end of the first transfer member;

wherein the cleaning and deterrent device can dispose the cleaning water onto the water apparatus via the nozzle member;

wherein the shutoff valve member is electrically controlled, and is connected between the storage member and the nozzle member;

wherein the motion sensor member is electrically connected between the power source member and the shutoff valve member; and wherein the motion sensor member is positioned to detect movement upon a top side surface of the water apparatus.

2. The cleaning and deterrent device of claim 1, further comprising a device switch capable of energizing and de-energizing the cleaning and deterrent device, wherein the device switch is electrically connected between the power source member and the pump member.

3. The cleaning and deterrent device of claim 1, further comprising a filter member capable of filtering the cleaning water, wherein the filter member is connected to the first end of the first transfer member.

4. The cleaning and deterrent device of claim 1, further comprising a check valve member capable of preventing back flow within the cleaning and deterrent device, wherein the check valve member is connected between the first transfer member and the storage member.

5. The cleaning and deterrent device of claim 1, further comprising a pressure control member capable of engaging the pump member to attain a designated water pressure within the cleaning and deterrent device, and further capable of turning off the pump member upon attaining the designated water pressure, wherein the pressure control member is connected between the pump member and the storage member.

6. The cleaning and deterrent device of claim 1, further comprising a motion sensor switch electrically connected between the power source member and the motion sensor member.

7. The cleaning and deterrent device of claim 1, further comprising a device switch capable of allowing and preventing the cleaning and deterrent device to operate, wherein the device switch is electrically connected between the motion sensor member and the shutoff valve member.

8. The cleaning and deterrent device of claim 1, wherein the power source member is in the form of a rechargeable battery.

9. The cleaning and deterrent device of claim 8, further comprising a charging member capable of maintaining the rechargeable battery in a fully-charged state, wherein the charging member is electrically connected to the rechargeable battery.

10. The cleaning and deterrent device of claim 9, wherein the charging member is in the form of a solar panel.

11. The cleaning and deterrent device of claim 8, further comprising a voltage control member capable of preventing the rechargeable battery from being overcharged, wherein the voltage control member is electrically connected between the rechargeable battery and the shutoff valve member.

12. The cleaning and deterrent device of claim 1, further comprising a header member capable of accommodating a plurality of nozzle members, wherein the header member is connected between the second end of the third transfer member and the inlet ends of the plurality of nozzle members.

13. The cleaning and deterrent device of claim 1, wherein the cleaning water is expelled from the nozzle member at a water pressure of about 60 psi to about 120 psi.

14. The cleaning and deterrent device of claim 1, further comprising an encasement member, wherein at least a portion of the cleaning and deterrent device is disposed within the encasement member.

15. A method of making a cleaning and deterrent device, comprising:

A. providing a first transfer member having a first end and a second end, a pump member having an inlet element and an outlet element, a second transfer member having a first end and a second end, a storage member having an inlet element and an outlet element, a third transfer member having a first end and a second end, a nozzle member having an inlet end and an outlet end, a power source member, a motion sensor member capable of detecting movement, and a shutoff valve member capable of allowing and preventing a cleaning water flow within the cleaning and deterrent device, wherein the shutoff valve is electrically controlled;

B. connecting the second end of the first transfer member to the inlet element of the pump member;

C. connecting the first end of the second transfer member to the outlet element of the pump member;

D. connecting the second end of the second transfer member to the inlet element of the storage member;

E. connecting the first end of the third transfer member to the outlet element of the storage member;

F. connecting the second end of the third transfer member to the inlet end of the nozzle member;

G. electrically connecting the pump member to the power source member;

H. connecting the shutoff valve member between the storage member and the nozzle member;

I. Electrically connecting the motion sensor member between the shutoff valve member and the power source member; and J. positioning the motion sensor member to detect movement upon a top side surface of the water apparatus.

16. The method of claim 15, further comprising at least one selected from the group consisting of providing a device switch and electrically connecting the device switch between the power source member and the pump member; providing a filter member and connecting the filter member to the first end of the first transfer member; providing a check valve member and connecting the check valve member between the first transfer member and the storage member; providing a pressure control member and connecting the pressure control member between the pump member and the storage member; providing a charging member and electrically connecting the charging member to the power source member; providing a header member and connecting the header member between the third transfer member and the nozzle member; and providing an encasement member and disposing at least a portion of the cleaning and deterrent device within the encasement member.

17. The method of claim 15, wherein the power source member is in the form of rechargeable battery.

18. The method of claim 17, further comprising providing a charging member, and electrically connecting the charging member to the rechargeable battery.

19. The method of claim 18, further comprising providing a voltage control member, and electrically connecting the voltage control member between the rechargeable battery and the charging member.

20. The method of claim 15, further comprising providing a motion sensor switch, and electrically connecting the motion sensor switch between the motion sensor member and the power source member.

21. The method of claim 15, further comprising providing a voltage control member, and electrically connecting the voltage control member between the electrical shutoff valve member and the power source member.

22. A method of using a cleaning and deterrent device, comprising:
  A. providing a water apparatus;
  B. disposing the water apparatus into a water body, wherein the water body comprises cleaning water;
  C. providing a cleaning and deterrent device comprising a first transfer member having a first end and a second end, a pump member having an inlet element and an outlet element, a second transfer member having a first end and a second end, a storage member having an inlet element and an outlet element, a third transfer member having a first end and a second end, a nozzle member having an inlet end and an outlet end, a power source member, a motion sensor member capable of detecting movement, and a shutoff valve member capable of allowing and preventing a cleaning water flow within the cleaning and deterrent device;
  D. disposing the cleaning and deterrent device upon the water apparatus;
  E. positioning the nozzle member such that cleaning water expelled by the cleaning and deterrent device contacts a target area of the water apparatus during operation of the cleaning and deterrent device;
  F. disposing the first end of the first transfer member into the water body;
  G. positioning the motion sensor member to detect movement upon a top side surface of the water apparatus; and
  H. energizing the device via the power source member;

wherein the second end of the of the first transfer member is connected to the inlet element of the pump member;

wherein the first end of the second transfer member is connected to the outlet element of the pump member and the second end of the second transfer member is connected to the inlet element of the storage member;

wherein the first end of the third transfer member is connected to the outlet element of the storage member and the second end of the third transfer member is connected to the inlet end of the nozzle member;

wherein the pump member is electrically connected to the power source member;

wherein the shutoff valve member is electrically controlled, and is connected between the storage member and the nozzle member; and wherein the motion sensor member is electrically connected between the power source member and the shutoff valve member.

23. The method of claim 22, wherein the cleaning and deterrent device further comprises at least one selected from the group consisting of a device switch electrically connected between the power source member and the pump member; a filter member connected to the first end of the first transfer member; a check valve member connected between the first transfer member and the storage member; a pressure control member connected between the pump member and the storage member; a charging member electrically connected to the power source member; a header member connected between the third transfer member and the nozzle member; and an encasement member wherein at least a portion of the cleaning and deterrent device is disposed therein.

24. The method of claim 22, wherein the power source member is in the form of a rechargeable battery.

25. The method of claim 24, wherein the cleaning and deterrent device further comprises a charging member, and wherein the charging member is electrically connected to the rechargeable battery.

26. The method of claim 25, wherein the cleaning and deterrent device further comprises a voltage control member, and wherein the voltage control member is electrically connected between the rechargeable battery and the charging member.

27. The method of claim 22, wherein the cleaning and deterrent device further comprises a motion sensor switch wherein the motion sensor switch is electrically connected between the motion sensor member and the power source member.

28. The method of claim 22, wherein the cleaning and deterrent device further comprises a voltage control member, wherein the voltage control member is electrically connected between the electrical shutoff valve member and the power source member.

* * * * *